United States Patent
Minemura et al.

(10) Patent No.: US 9,056,721 B2
(45) Date of Patent: Jun. 16, 2015

(54) RECORDING APPARATUS AND ONE-WAY COMPOUND GEAR MECHANISM

(71) Applicant: SEIKO EPSON CORPORATION, Tokyo (JP)

(72) Inventors: Hidefumi Minemura, Shiojiri (JP); Tomoya Takikawa, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 13/961,215

(22) Filed: Aug. 7, 2013

(65) Prior Publication Data

US 2014/0041998 A1 Feb. 13, 2014

(30) Foreign Application Priority Data

Aug. 8, 2012 (JP) ................. 2012-176360

(51) Int. Cl.
*B65G 13/073* (2006.01)
*B65H 20/00* (2006.01)

(52) U.S. Cl.
CPC ......... *B65G 13/073* (2013.01); *Y10T 74/19605* (2015.01); *B65H 2403/00* (2013.01); *B65H 20/00* (2013.01)

(58) Field of Classification Search
CPC ............. B65G 13/073; B65H 2403/00; Y10T 74/19605
See application file for complete search history.

(56) References Cited

U.S. PATENT DOCUMENTS

| | | | | |
|---|---|---|---|---|
| 4,914,452 A | * | 4/1990 | Fukawa | 347/214 |
| 5,011,448 A | * | 4/1991 | Asano | 446/293 |
| 5,820,275 A | * | 10/1998 | Crawford et al. | 400/185 |
| 5,882,127 A | * | 3/1999 | Amano | 400/521 |
| 7,836,732 B1 | * | 11/2010 | Chen et al. | 66/151 |
| 8,123,210 B1 | * | 2/2012 | Murray | 271/4.04 |
| 2007/0173368 A1 | | 7/2007 | Takada | |
| 2010/0263481 A1 | * | 10/2010 | Klein | 74/810.1 |
| 2011/0062271 A1 | * | 3/2011 | Yanagishita | 242/390.2 |
| 2011/0187050 A1 | * | 8/2011 | Tamura et al. | 271/264 |
| 2012/0070173 A1 | * | 3/2012 | Arakawa | 399/67 |
| 2012/0102705 A1 | * | 5/2012 | Murray | 29/428 |
| 2012/0187620 A1 | * | 7/2012 | Kitamura | 271/10.01 |

FOREIGN PATENT DOCUMENTS

| | | |
|---|---|---|
| JP | 10-331941 | 12/1998 |
| JP | 2006-258175 | 9/2006 |
| JP | 2007-198471 | 8/2007 |

* cited by examiner

*Primary Examiner* — Gene Crawford
*Assistant Examiner* — Thomas Randazzo
(74) *Attorney, Agent, or Firm* — Workman Nydegger

(57) ABSTRACT

A recording apparatus includes a feeding roller and a power transmission mechanism for transmitting a driving force to the feeding roller. The power transmission mechanism includes a one-way compound gear mechanism that integrally includes a first one-way gear mechanism which is engaged with a first gear rotating forwardly or reversely by receiving the driving force from the driving source, rotates together with the first gear in a forward direction by receiving the driving force from the first gear at the time of the forward rotation and rotates idly with respect to the first gear at the time of the reverse rotation, and a second one-way gear mechanism which rotates idly with respect to the first gear at the time of the forward rotation and rotates with the first gear in a reverse direction by receiving the driving force from the first gear during the reverse rotation.

11 Claims, 11 Drawing Sheets

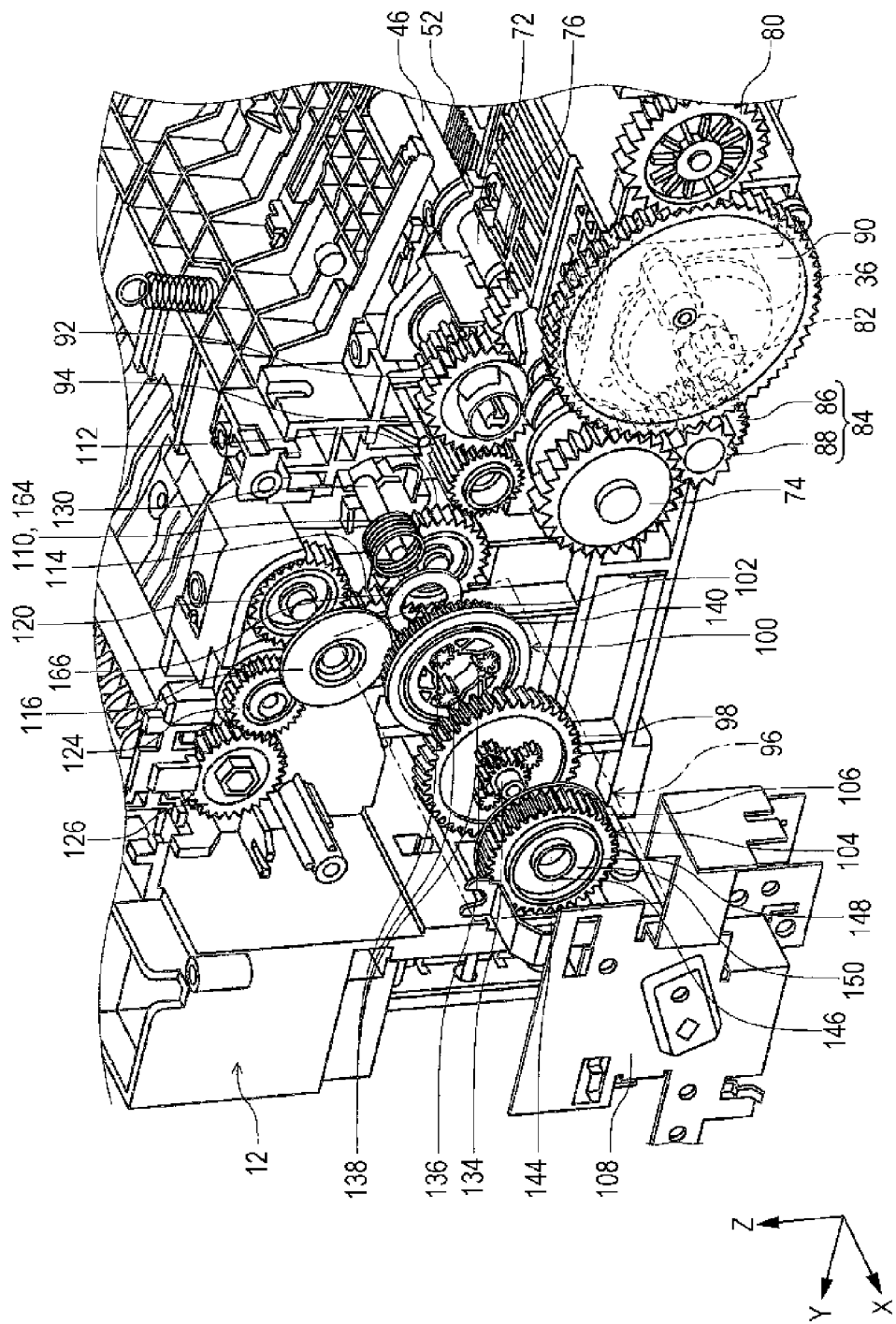

RECORDING APPARATUS AND ONE-WAY COMPOUND GEAR MECHANISM

BACKGROUND

1. Technical Field

The present invention relates to a recording apparatus provided with a power transmission mechanism for driving a feeding roller and a one-way compound gear mechanism.

In the application, the recording apparatus includes an ink jet printer, a copying machine, a facsimile or the like.

2. Related Art

In recent years, a recording apparatus has a configuration in which a feeding roller is driven by a driving force of a transporting roller. Furthermore, in such a recording apparatus, a reversal passage to reverse a recording medium is provided for performing a double-sided recording. Therefore, in the recording apparatus, one recording surface of the recording medium is recorded by a recording portion, and then the recording medium is sent to the reversal passage by rotating the transporting roller reversely. Subsequently, the recording medium is resent to a feeding passage by the feeding roller, and the other recording surface is recorded by the recording portion. Thereafter, the recording medium is discharged from the recording apparatus.

However, it is necessary for the recording apparatus to cause the feeding roller to rotate in the same direction regardless of a forward rotation or a reverse rotation of the transporting roller. Therefore, a recording apparatus of which a driving mechanism for driving a feeding roller is provided with a one-way clutch has been disclosed in JP-A-10-331941.

The one-way clutch disclosed in JP-A-10-331941 includes a planetary gear, an inner member provided with a recessed portion for accommodating the planetary gear, and an outer member formed with an internal gear engaged with the planetary gear. In the recessed portion, a protrusion is formed on one surface and not formed on the other surface.

Therefore, when the inner member rotates in a predetermined direction and the planetary gear is brought into contact with the other surface (the surface not formed with a protrusion) of the recessed portion, the planetary gear rotates in the recessed portion of the inner member. In this case, the planetary gear only causes a change of engagement with respect to the internal gear of the outer member, and therefore torque is not transmitted from the inner member to the outer member.

However, when the inner member rotates in a direction opposite to the predetermined direction and the planetary gear is brought into contact with one surface (the surface formed with a protrusion) of the recessed portion, the rotation of the planetary gear in the recessed portion of the inner member is locked by the protrusion. In this case, the planetary gear cannot cause the change of engagement with respect to the internal gear of the outer member, and therefore the torque is transmitted from the inner member to the outer member via the planetary gear.

Furthermore, since the one-way clutch described above does not cause the torque to be transmitted to the outer member when the inner member rotates in the predetermined direction, the feeding roller does not rotate. Thus, the feeding roller does not rotate in either one case of the forward rotation or the reverse rotation of the transporting roller. Therefore, it is necessary for the driving mechanism to cause the feeding roller to rotate in one direction whenever the transporting roller rotates in the forward direction of the reverse direction.

FIGS. 11A and 11B show schematic views of a driving mechanism which adopts a plurality of one-way clutches so as to enable the feeding roller to rotate in one direction whenever the transporting roller rotates in the forward direction of the reverse direction. In the driving mechanism, one-way clutches 174 and 176 are respectively provided on both sides of a center gear 172 which is engaged with a gear 170 receiving a driving force from the transporting roller. Hereinafter, the driving mechanism will be described.

The one-way clutch 174 disposed on one side of the center gear 172 includes an outer member 174a and an inner member 174b. The one-way clutch 174 is configured so as to transmit torque when rotating in a predetermined direction (a counter-clockwise direction in FIGS. 11A and 11B). In addition, the one-way clutch 176 disposed on the other side of the center gear 172 includes an outer member 176a and an inner member 176b. The one-way clutch 176 is configured so as to transmit torque when rotating in a direction opposite to the predetermined direction (a clockwise direction in FIGS. 11A and 11B).

The outer member 174a of the one-way clutch 174 is engaged with a gear 178, and the gear 178 is engaged with a gear 180. The gear 180 is engaged with a driving gear 182 for driving a feeding roller and is coaxially provided with a gear 184. Furthermore, the outer member 176a of the one-way clutch 176 is engaged with a gear 186, and the gear 186 is engaged with a gear 188. The gear 188 is engaged with the gear 184. In addition, the inner members 174b and 176b are configured so as to rotate together with the center gear 172 in a rotation direction of the center gear.

As shown in FIG. 11A, the center gear 172 rotates in a reverse direction, namely a counter-clockwise direction, when the gear 170 rotates in a forward direction, namely a clockwise direction. Corresponding to this rotation, the inner members 174b and 176b rotate in a counter-clockwise direction, as well. Thereby, the one-way clutch 174 is in a torque-transmittable state, and therefore the outer member 174a and the inner member 174b integrally rotate in a counter-clockwise direction. In addition, since the one-way clutch 176 is in a non-torque-transmittable state, the outer member 176a can rotate relatively to the inner member 176b.

When the outer member 174a rotates in a counter-clockwise direction, the gear 178 rotates in a clockwise direction. Thus, the gear 178 causes the gear 180 to rotate in a counter-clockwise direction. The gear 180 causes the driving gear 182 to rotate in a clockwise direction. Furthermore, when the gear 180 rotates in a counter-clockwise direction, the coaxial gear 184 rotates in a counter-clockwise direction, as well. Thus, the gear 184 causes the gear 188 to rotate in a clockwise direction. The gear 188 causes the gear 186 to rotate in a counter-clockwise direction, and the gear 186 causes the outer member 176a to idly rotate in a clockwise direction.

On the other hand, the center gear 172 rotates in a forward direction, namely a clockwise direction, when the gear 170 rotates in a reverse direction, namely a counter-clockwise direction, as shown in FIG. 11B. Corresponding to this rotation, the inner members 174b and 176b rotate in a clockwise direction, as well. Thereby, the one-way clutch 176 is in a torque transmission state, and therefore the outer member 176a and the inner member 176b integrally rotate in a clockwise direction. In addition, since the one-way clutch 174 is in a non-torque-transmission state, the outer member 174a can rotate relatively to the inner member 174b.

When the outer member 176a rotates in a clockwise direction, the gear 186 rotates in a counter-clockwise direction. Thus, the gear 186 causes the gear 188 to rotate in a clockwise direction. The gear 188 causes the gear 184 to rotate in a clock-clockwise direction. Furthermore, when the gear 184 rotates in a counter-clockwise direction, the coaxial gear 180 rotates in a counter-clockwise direction, as well. Therefore, the gear 180 causes the driving gear 182 to rotate in a clockwise direction. In other words, the feeding roller in the driving mechanism is driven rotatably in one direction regardless of the rotation direction of the transporting roller. In addition, when the gear 180 rotates in a counter-clockwise direction, the gear 180 causes the gear 178 to rotate in a clockwise direction. The gear 178 causes the outer member 176a to idly rotate in a counter-clockwise direction.

Meanwhile, corresponding to the rotation direction of the center gear 172, either one of the one-way clutch 174 or the one-way clutch 176 in the driving mechanism is in a non-torque-transmittable state. Therefore, the one-way clutch 174 or the one-way clutch 176 idly rotate with respect to the center gear 172 by the gears 178 and 186 respectively engaged therewith. At this time, only the dead load of the one-way clutch acts on each of the one-way clutches 174 and 176 rotating idly.

Therefore, a force which causes the idle rotation of the one-way clutch 174 or 176 to be braked does not act in the idle-rotation direction of the one-way clutch 174 or 176. Thus, when a tooth of the gear 178 is brought into contact with a tooth of the one-way clutch 174 so as to cause the one-way clutch 174 to rotate idly, the tooth of the one-way clutch 174 is swiftly displaced in an idle-rotation direction.

As a result, before the next tooth of the gear 178 is displaced to the position where the next tooth is to be engaged with the one-way clutch 174, a tooth of the one-way clutch 174 which is adjacent to the displaced tooth of the one-way clutch 174 is displaced to the engagement position. Therefore, the adjacent tooth of the one-way clutch 174 is brought to collide with the tooth of the gear 178 which has caused the tooth of the one-way clutch 174 to be displaced. In other words, the idle rotation of the one-way clutch 174 is performed prior to the rotation of the gear 178, and therefore the engagement between the gear 178 and the one-way clutch 174 is not carried out smoothly.

In addition, when the tooth of the one-way clutch 174 collides with the tooth of the gear 178, collision noise is generated between them. Therefore, the one-way clutch 174 is not smoothly engaged with the gear 178 during the idle rotation of the one-way clutch 174, and thus the collision noise is continuously generated in the teeth of the gears. Similarly, the collision noise is continuously generated in the one-way clutch 176 when the one-way clutch 176 is idly rotated by the gear 186. Thus, the driving mechanism has a problem in that operation noise thereof is loud in a driving state.

SUMMARY

An advantage of some aspects of the invention is to provide a recording apparatus capable of reducing operation noise of a power transmission mechanism for driving a feeding roller.

According to an aspect of the invention, there is provided a recording apparatus including: a feeding roller which feeds a recording medium in a downstream direction of a feeding passage by rotating forwardly; and a power transmission mechanism for transmitting a driving force from a driving source to the feeding roller, in which the power transmission mechanism includes: a one-way compound gear mechanism that integrally includes a first one-way gear mechanism which is engaged with a first gear rotating forwardly or reversely by receiving the driving force from the driving source, rotates together with the first gear in a forward direction by receiving the driving force from the first gear at the time of the forward rotation and rotates idly with respect to the first gear at the time of the reverse rotation, and a second one-way gear mechanism which is engaged with the first gear, rotates idly with respect to the first gear at the time of the forward rotation and rotates together with the first gear in a reverse direction by receiving the driving force from the first gear at the time of the reverse rotation; a first power transmission passage which is a power transmission passage between the first one-way gear mechanism and the feeding roller, causes the feeding roller to rotate forwardly by receiving the driving force from the first one-way gear mechanism at the time of the forward rotation of the first gear and causes the first one-way gear mechanism to idly rotate by receiving the driving force from the feeding roller at the time of the reverse rotation of the first gear; and a second power transmission passage which is a power transmission passage between the second one-way gear mechanism and the feeding roller, causes the feeding roller to rotate forwardly by receiving the driving force from the second one-way gear mechanism at the time of the reverse rotation of the first gear and causes the second one-way gear mechanism to idly rotate by receiving the driving force from the feeding roller at the time the forward rotation of the first gear, and the one-way compound gear mechanism includes a second gear that is disposed coaxially with the first gear, transmits the driving force to the first power transmission passage and constitutes the first one-way gear mechanism, a third gear that is disposed coaxially with the first gear, transmits the driving force to the second power transmission passage and constitutes the second one-way gear mechanism, and a resistance applying unit for applying a rotational resistance to both gears.

According to the aspect described above, it is possible for the resistance applying unit to apply the rotational resistance to the second gear of the first one-way gear mechanism which rotates idly at the time of the reverse rotation of the first gear and to the third gear of the second one-way gear mechanism which rotates idly at the time of the forward rotation of the first gear. Therefore, it is possible to reduce the displacement momentum in an idle-rotation direction of a tooth of the second gear or the third gear when the second gear or the third gear rotates idly. Thereby, it is possible to smoothly perform the engagement of the gears.

Thus, it is possible to reduce the operation noise which is generated in the first one-way gear mechanism or the second one-way gear mechanism at the time of the idle rotation of the second gear or the third gear and is caused by a contact defect or an engagement defect of the gears.

In the recording apparatus according to the aspect of the invention, it is preferable that the resistance applying unit be a single biasing member to press the one-way compound gear mechanism in an axial direction of the one-way compound gear mechanism.

According to the aspect described above, it is possible to achieve the following operation effect, in addition to the same operation effect as that of the aspect of the invention. In the aspect described above, it is possible for the resistance applying unit to be constituted by a single biasing member. Therefore, it is possible to achieve the simple configuration and the cost reduction of the power transmission mechanism.

In the recording apparatus according to the aspect of the invention, it is preferable that the first power transmission passage include a first transmission gear engaged with the second gear and a second transmission gear engaged with the first transmission gear, the second power transmission passage includes a third transmission gear engaged with the third gear, and the power transmission mechanism includes a fourth transmission gear which is engaged with the second transmission gear and the third transmission gear so as to cause the driving force from the first power transmission passage or the second power transmission passage to be transmitted to the feeding roller, and to cause the driving force from the first power transmission passage to be transmitted to the second power transmission passage or to cause the driving force from the second power transmission passage to be transmitted to the first power transmission passage.

According to the aspect described above, it is possible to achieve the following operation effect, in addition to the same operation effect as that of the aspect of the invention. In the aspect described above, the power transmission mechanism is configured so that the first power transmission passage is constituted by the first transmission gear and the second transmission gear, the second power transmission passage is constituted by the third transmission gear, and the driving force from the first power transmission passage or the second power transmission passage is received by the fourth transmission gear. Therefore, it is possible to cause the feeding roller to rotate only in one direction regardless of the rotation direction of the first gear which receives the driving force from the driving source. In other words, it is possible to maintain the rotation direction of the feeding roller in a predetermined rotation direction, regardless of the rotation direction of the driving source. Therefore, it is possible to perform a double-sided recording of a recording medium by causing the driving source to rotate reversely.

The recording apparatus according to the aspect of the invention may include a transporting roller which transports the recording medium and rotates forwardly or reversely corresponding to a rotation direction of the driving source in which the power transmission mechanism includes a fifth transmission gear to transmit the driving force from the driving source to the transporting roller, and the fifth transmission gear is a compound gear coaxially provided with a large gear and a small gear.

According to the aspect described above, it is possible to achieve the following operation effect, in addition to the same operation effect as that of the aspect of the invention. In the aspect described above, the fifth transmission gear is constituted by the coaxially disposed large gear and small gear. Thus, upon comparison with the case constituted by a single gear, the thickness of the gear in the axial direction is increased. Therefore, it is possible to improve the rigidity of the fifth transmission gear. Thereby, vibration of the gear can be reduced. As a result, it is possible to reduce the noise due to the vibration of the gear.

In the recording apparatus according to the aspect of the invention, it is preferable that the number of teeth of the large gear and the number of teeth of the small gear be set to the value in which the frequency thereof is not overlapped with a resonance frequency of a apparatus main body provided with the power transmission mechanism.

According to the aspect described above, it is possible to achieve the following operation effect, in addition to the same operation effect as that of the aspect of the invention. In the aspect described above, the number of the teeth of the large gear and the number of the teeth of the small gear are set to the value, namely the number of teeth, in which a frequency thereof is not overlapped with the resonance frequency (the frequency) of the apparatus main body. Therefore, there is less or no possibility of the amplification of noise, which is radiated from the apparatus main body, by resonance phenomena. Thus, it is possible to reduce the noise which is radiated from the apparatus main body and caused by the power transmission mechanism.

In the recording apparatus according to the aspect of the invention, it is preferable that a ratio of the number of the teeth of the large gear of the fifth transmission gear and the number of the teeth of the small gear be set to be a non-integer multiple.

According to the aspect described above, it is possible to the following operation effect, in addition to the same operation effect as that of the aspect of the invention. In the aspect described above, the ratio of the number of the teeth of the large gear and the number of the teeth of the small gear is set to be a non-integer multiple. Therefore, the teeth of the large gear are prevented from being always engaged with the same teeth of a gear engaged therewith. Thereby, it is possible to suppress partial wear of a tooth surface. Similarly, the teeth of the small gear are prevented from being always engaged with the same teeth of a gear engaged therewith. Thereby, it is possible to suppress partial wear of a tooth surface.

In the recording apparatus according to the aspect of the invention, it is preferable that a reduction ratio of the large gear of the fifth transmission gear and a gear engaged with the large gear be set to be a non-integer multiple of a reduction ratio of the small gear and a gear engaged with the small gear.

According to the aspect described above, it is possible to achieve the following operation effect, in addition to the same operation effect as that of the aspect of the invention. In the aspect described above, the reduction ratio of the large gear and a gear engaged with the large gear is set to be a non-integer multiple of the reduction ratio of the small gear and a gear engaged with the small gear. Therefore, when the fifth transmission gear rotates, a frequency (a meshing frequency) of vibration in the small gear is a non-integer multiple of a frequency (a meshing frequency) of vibration in the large gear. Therefore, it is possible to prevent resonance phenomena. As a result, it is possible to reduce operation noise in the power transmission mechanism, which is caused by the engaging of gears.

In the recording apparatus according to the aspect of the invention, it is preferable that the power transmission mechanism include a plurality of gears, and a center distance between the gears be set to the value in which a tooth contact ratio is equal to or more than 1.

According to the aspect described above, it is possible to achieve the following operation effect, in addition to the same operation effect as that of the aspect of the invention. In the aspect described above, the center distance between the gears is set to the value in which a tooth contact ratio is equal to or more than 1. Therefore, it is possible to smoothly transmit the rotation of the gear, and thereby it is possible to reduce the vibration, namely the noise.

The recording apparatus according to the aspect of the invention may include a discharge roller which discharges a recording medium outside the apparatus main body, along a feeding passage, in which the power transmission mechanism transmits the driving force from the driving source to the discharge roller.

According to the aspect described above, it is possible to achieve the following operation effect, in addition to the same operation effect as that of the aspect of the invention. In the aspect described above, it is possible to drive the feeding roller, the transporting roller and the discharge roller by a common driving source. Thus, it is possible to unify a driving source. As a result, it is unnecessary to prepare a space for a plurality of driving sources in the apparatus main body, and therefore it is possible for the recording apparatus to be reduced in size. Furthermore, it is possible to simplify the configuration of the power transmission mechanism.

According to another aspect of the invention, there is provided an one-way compound gear mechanism including: a first gear which rotates forwardly or reversely by receiving a driving force from a driving source; a second gear which is engaged with the first gear, rotates together with the first gear in a forward direction by receiving the driving force from the first gear at the time of the forward rotation of the driving source, and rotates idly with respect to the first gear at the time of the reverse rotation of the driving source; a third gear which is engaged with the first gear, rotates idly with respect to the first gear at the time of the forward rotation of the driving source, and rotates together with the first gear in a reverse direction by receiving the driving force from the first gear at the time of the reverse rotation of the driving source, and a resistance applying unit which is disposed coaxially with the first gear and applies a rotational resistance to the second gear and the third gear.

According to the aspect described above, it is possible for the resistance applying unit to apply the rotational resistance to the second gear of the first one-way gear mechanism which rotates idly at the time of the reverse rotation of the first gear and to the third gear of the second one-way gear mechanism which rotates idly at the time of the forward rotation of the first gear. Therefore, it is possible to reduce the displacement momentum in the idle-rotation direction of the tooth of the second gear or the third gear when the second gear or the third gear rotates idly. Thereby, it is possible to smoothly perform the engagement of the gears.

In the one-way compound gear mechanism according to another aspect of the invention, it is preferable that the resistance applying unit be a single biasing member to press the one-way compound gear mechanism in an axial direction of the one-way compound gear mechanism.

According to the aspect described above, it is possible to achieve the following operation effect, in addition to the same operation effect as that of the aspect of the invention. In the aspect described above, it is possible for the resistance applying unit to be constituted by a single biasing member. Therefore, it is possible to achieve the simple configuration and the cost reduction.

BRIEF DESCRIPTION OF THE DRAWINGS

The invention will be described with reference to the accompanying drawings, wherein like numbers reference like elements.

FIG. 4 is an exploded perspective view of a one-way compound gear mechanism in the power transmission mechanism according to the first example.

DESCRIPTION OF EXEMPLARY EMBODIMENTS

Figure 1:
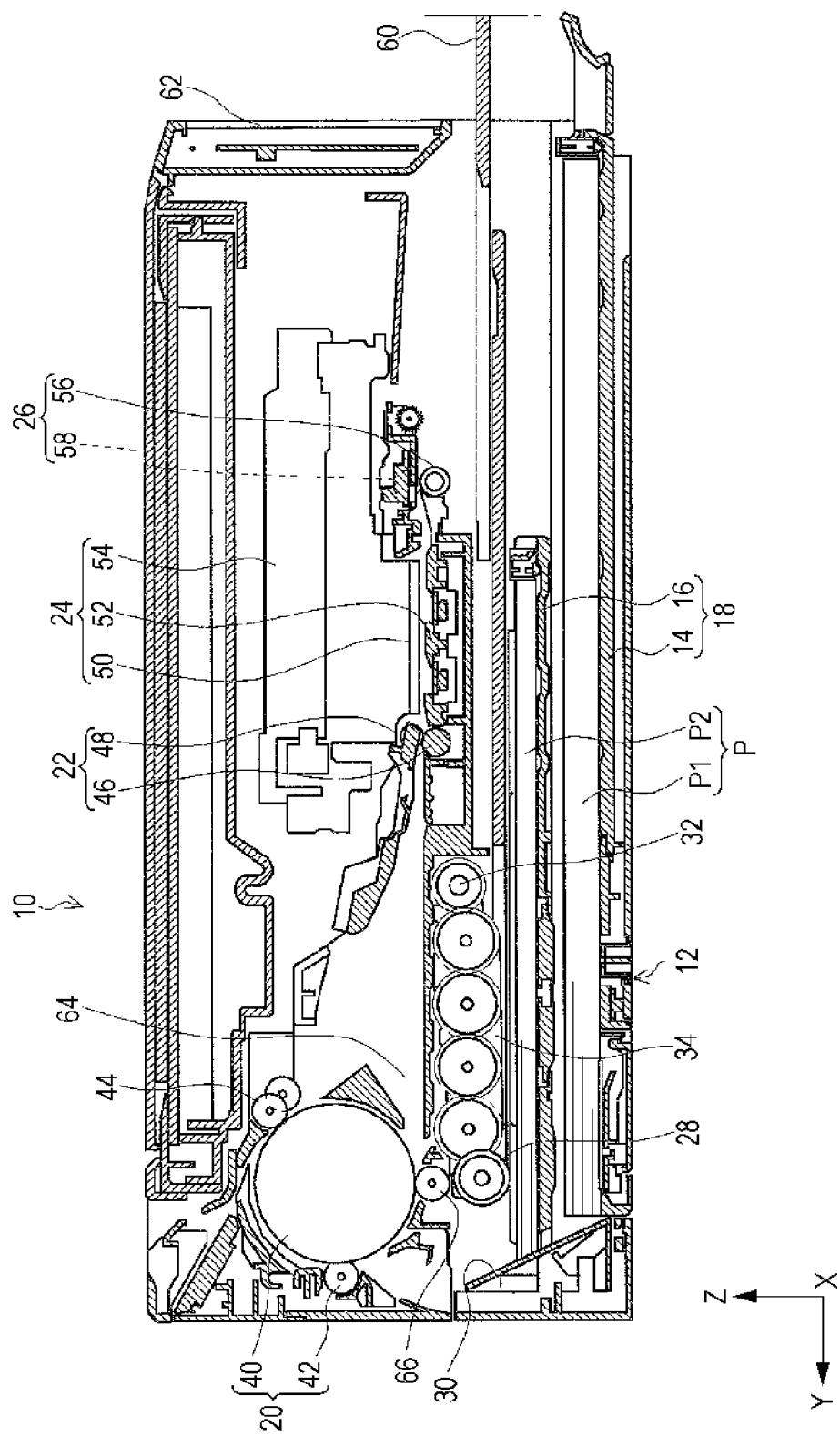
FIG. 1 is a cross-sectional side view showing a paper transport passage of a printer according to the invention.

Hereinafter, an embodiment of the invention will be described with reference to drawings. Further, the same reference numerals or symbols are given to the same configuration members in examples. The same configuration members will be described only in a description of the first example and omitted in descriptions of the other examples.

Figure 2:
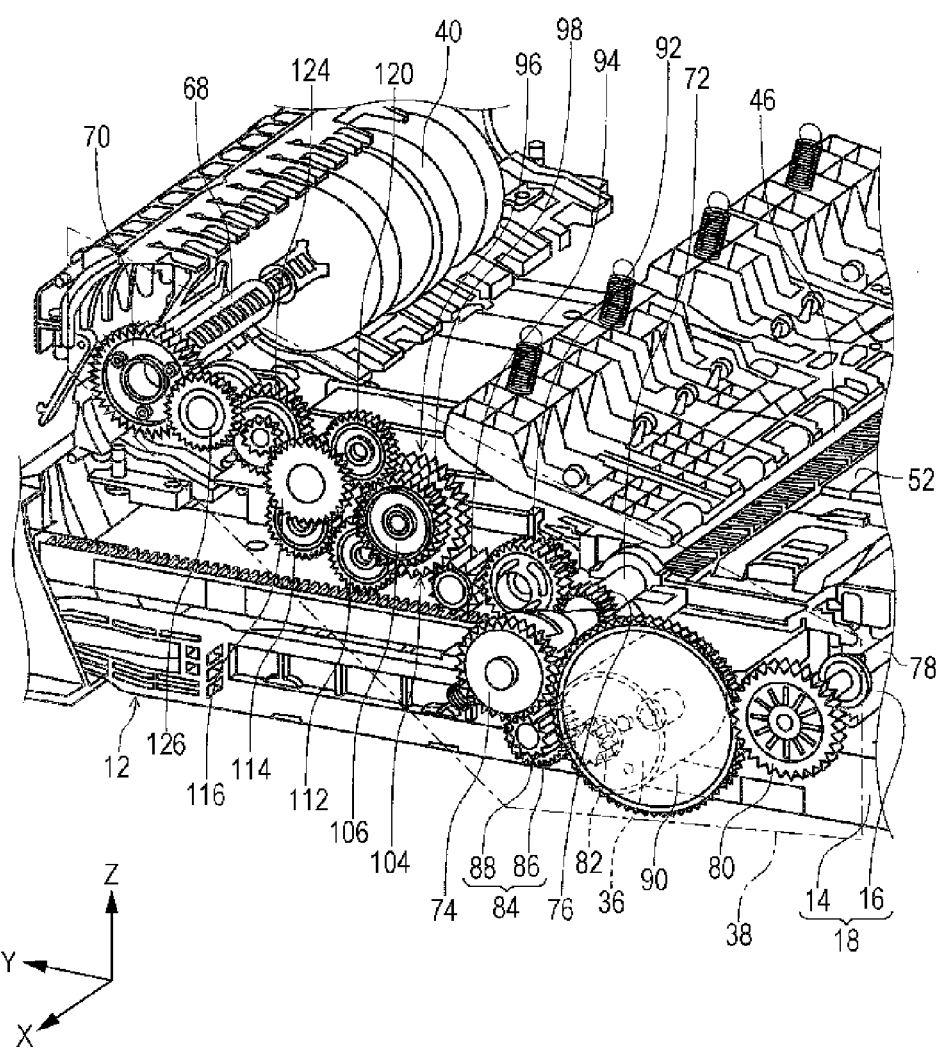
FIG. 2 is a perspective view of a power transmission mechanism according to a first example.
Figure 3:
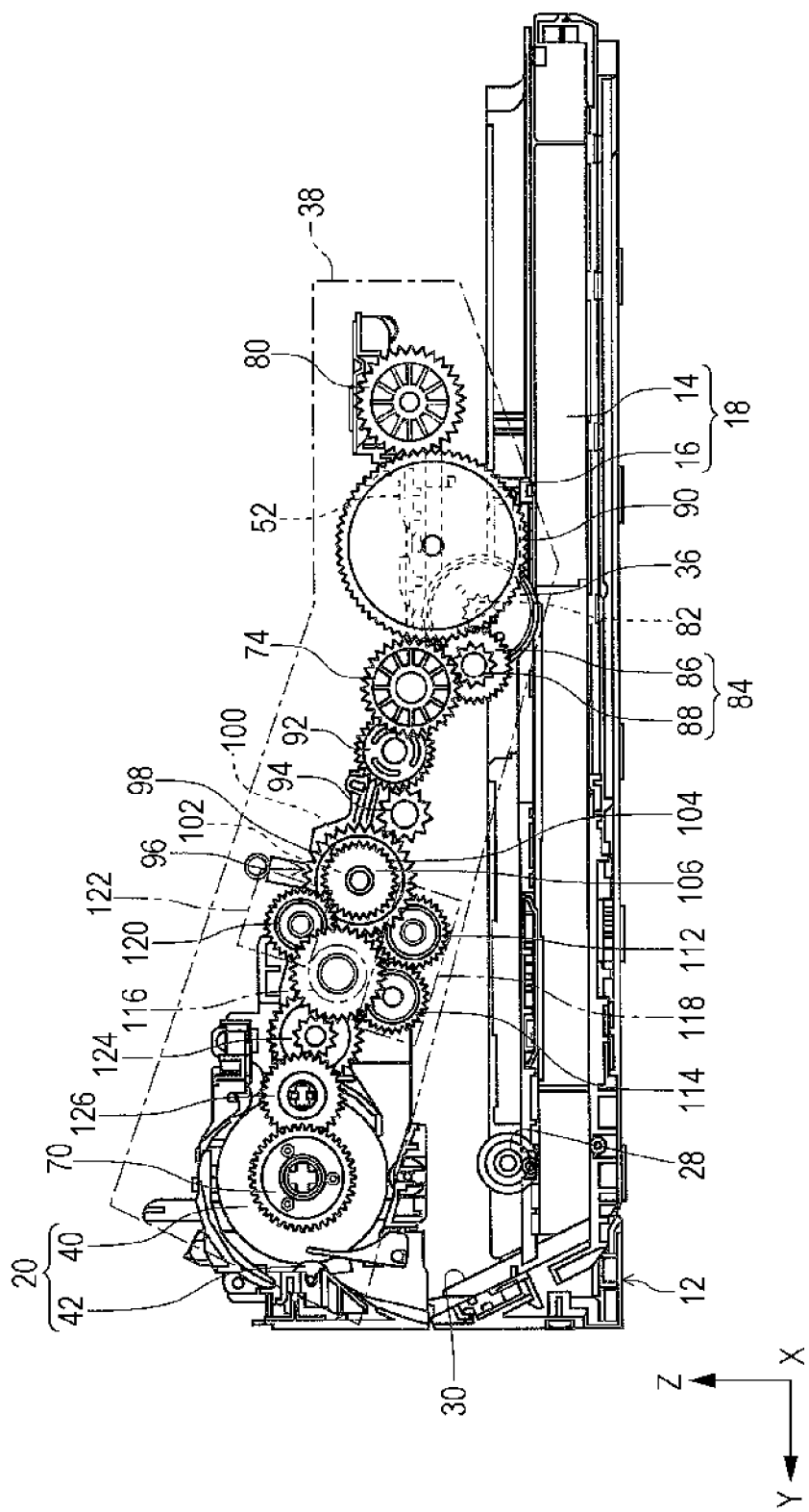
FIG. 3 is a side view of the power transmission mechanism according to the first example.
Figure 5A:
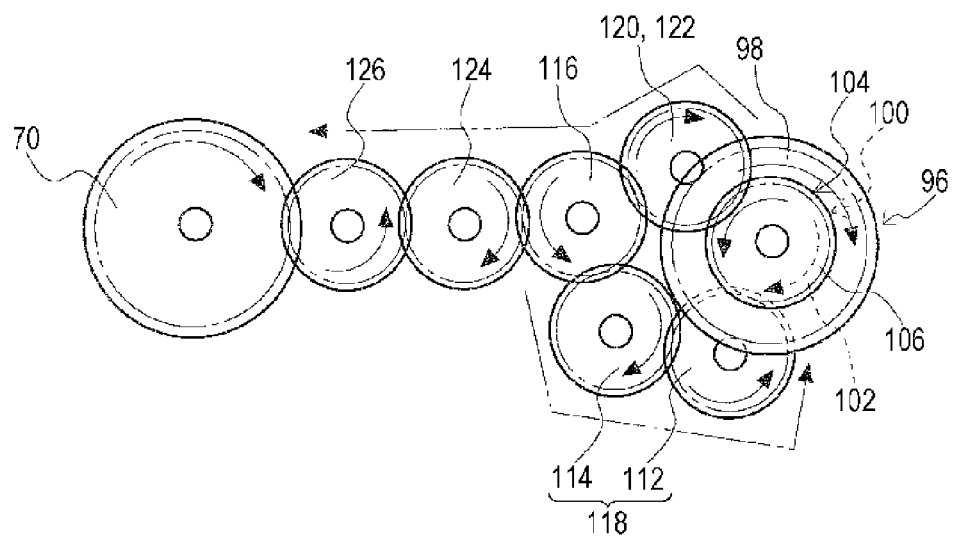
FIG. 5A is an explanatory view showing a motion of the one-way compound gear mechanism in the example when a first gear rotates forwardly.
Figure 5B:
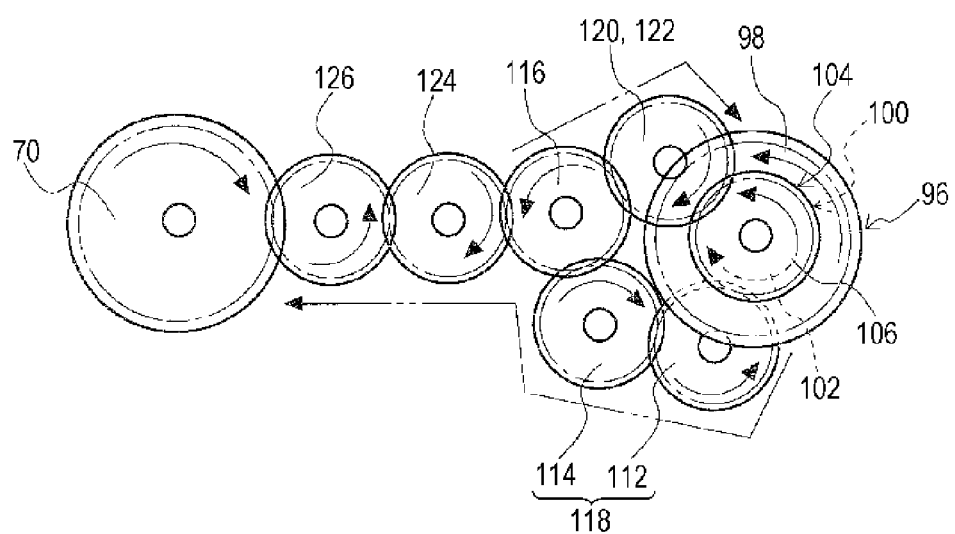
FIG. 5B is an explanatory view showing a motion of the one-way compound gear mechanism in the example when the first gear rotates reversely.
Figure 6A:
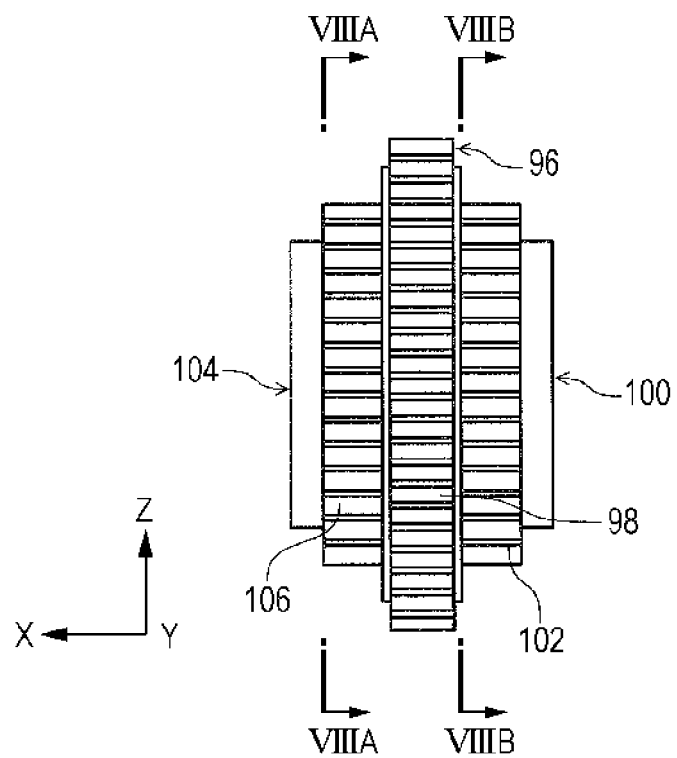
FIG. 6A is a side view of the one-way compound gear mechanism.
Figure 6B:
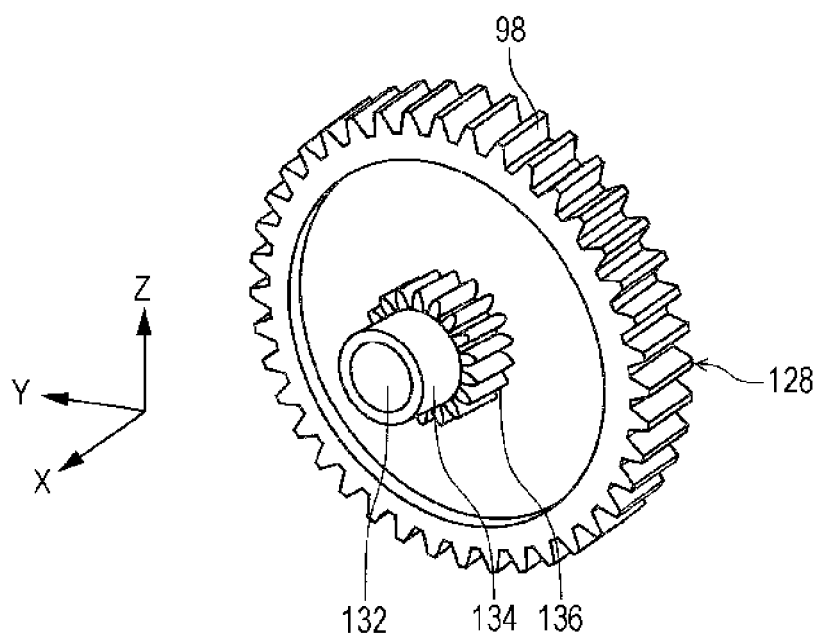
FIG. 6B is a perspective view of the first gear of the one-way compound gear mechanism.

FIG. 1 is a cross-sectional side view showing a paper transport passage of a printer according to the invention, and FIG. 2 is a perspective view of a power transmission mechanism according to a first example. FIG. 3 is a side view of the power transmission mechanism according to the first example, and FIG. 4 is an exploded perspective view of a one-way compound gear mechanism in the power transmission mechanism according to the first example. FIG. 5A is an explanatory view showing a motion of the one-way compound gear mechanism in the example when a first gear rotates forwardly, and FIG. 5B is an explanatory view showing a motion of the one-way compound gear mechanism in the example when the first gear rotates reversely. FIG. 6A is a side view of the one-way compound gear mechanism, and FIG. 6B is a perspective view of the first gear of the one-way compound gear mechanism.

Figure 7A:
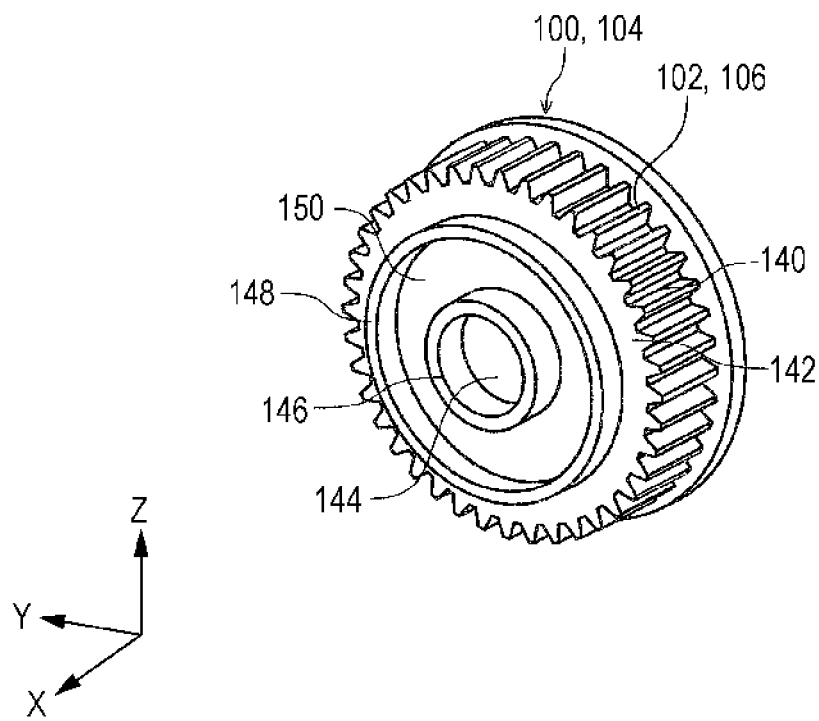
FIG. 7A is a perspective view of a second gear of the one-way compound gear mechanism.
Figure 7B:
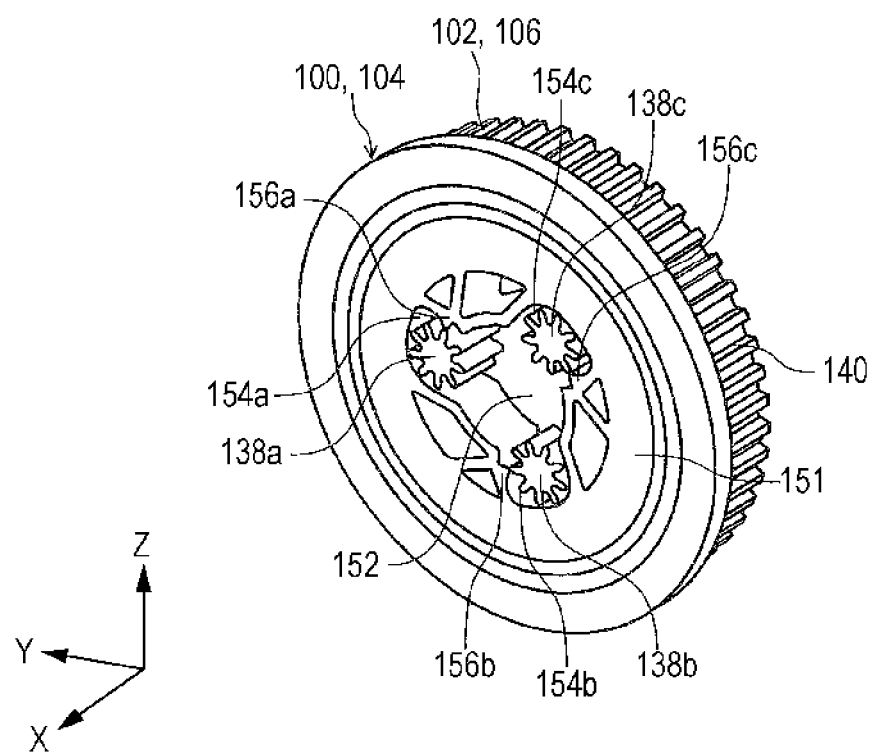
FIG. 7B is a perspective view of the second gear of the one-way compound gear mechanism.
Figure 8A:
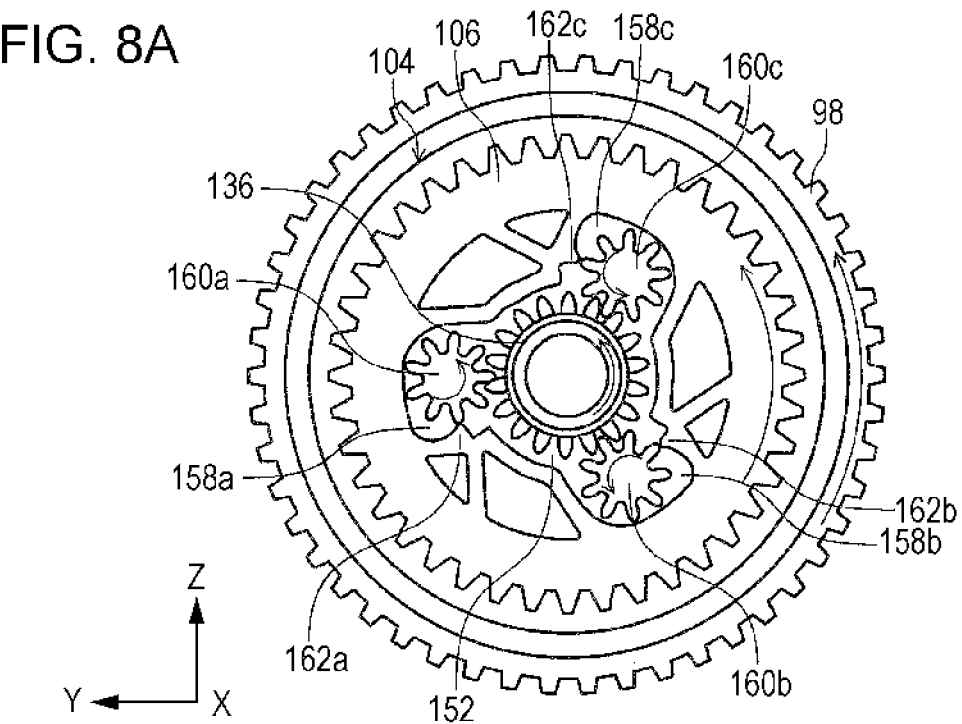
FIG. 8A is an explanatory view which is a cross-section taken along line VIIIA-VIIIA in FIG. 6A and shows a motion of a second one-way gear mechanism when the first gear rotates forwardly.
Figure 8B:
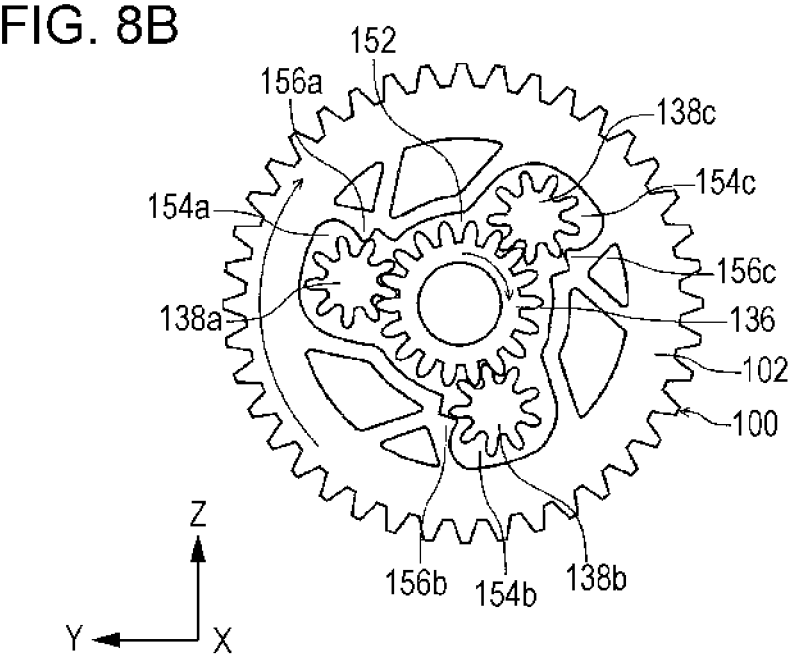
FIG. 8B is an explanatory view which is a cross-section taken along line VIIIB-VIIIB in FIG. 6A and shows a motion of a first one-way gear mechanism when the first gear rotates forwardly.
Figure 9A:
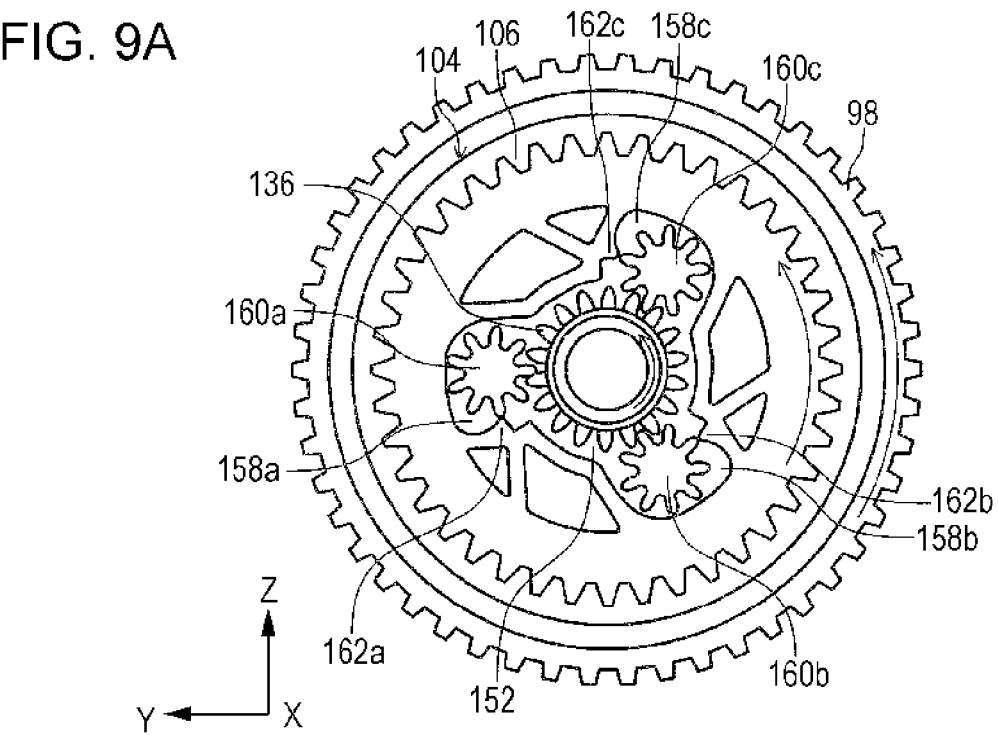
FIG. 9A is an explanatory view which is the cross-section taken along line VIIIIA-VIIIIA in FIG. 6A and shows a motion of the second one-way gear mechanism when the first gear rotates reversely.
Figure 9B:
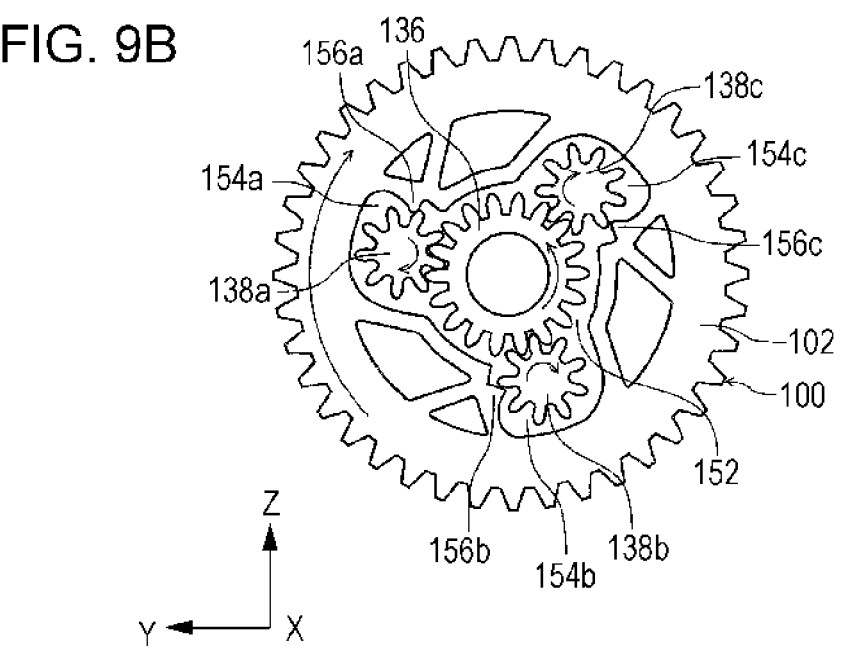
FIG. 9B is an explanatory view which is the cross-section taken along line VIIIIB-VIIIIB in FIG. 6A and shows a motion of the first one-way gear mechanism when the first gear rotates reversely.

FIG. 7A is a perspective view of a second gear of the one-way compound gear mechanism, and FIG. 7B is a perspective view of the second gear of the one-way compound gear mechanism. FIG. 8A is an explanatory view which is a cross-section taken along line VIIA-VIIA in FIG. 6A and shows a motion of a second one-way gear mechanism when the first gear rotates forwardly, and FIG. 8B is an explanatory view which is a cross-section taken along line VIIIB-VIIIB in FIG. 6A and shows a motion of a first one-way gear mechanism when the first gear rotates forwardly. FIG. 9A is an explanatory view which is the cross-section taken along line VIIIIA-VIIIIA in FIG. 6A and shows a motion of the second one-way gear mechanism when the first gear rotates reversely, and FIG. 9B is an explanatory view which is the cross-section taken along line VIIIIB-VIIIIB in FIG. 6A and shows a motion of the first one-way gear mechanism when the first gear rotates reversely.

Figure 10A:
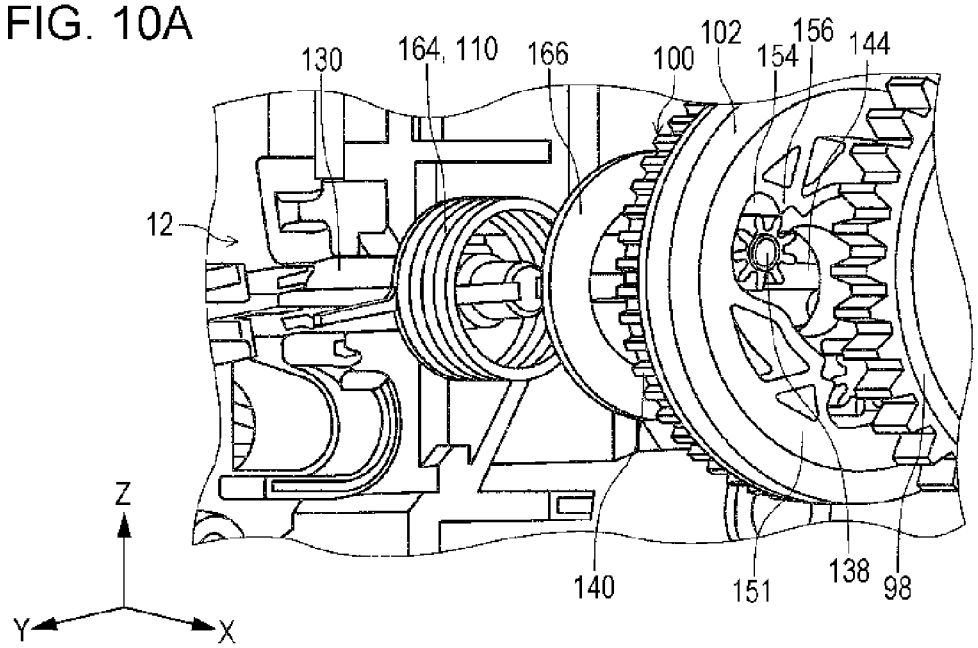
FIG. 10A is an explanatory view of a resistance applying unit for pressing the one-way compound gear mechanism.
Figure 10B:
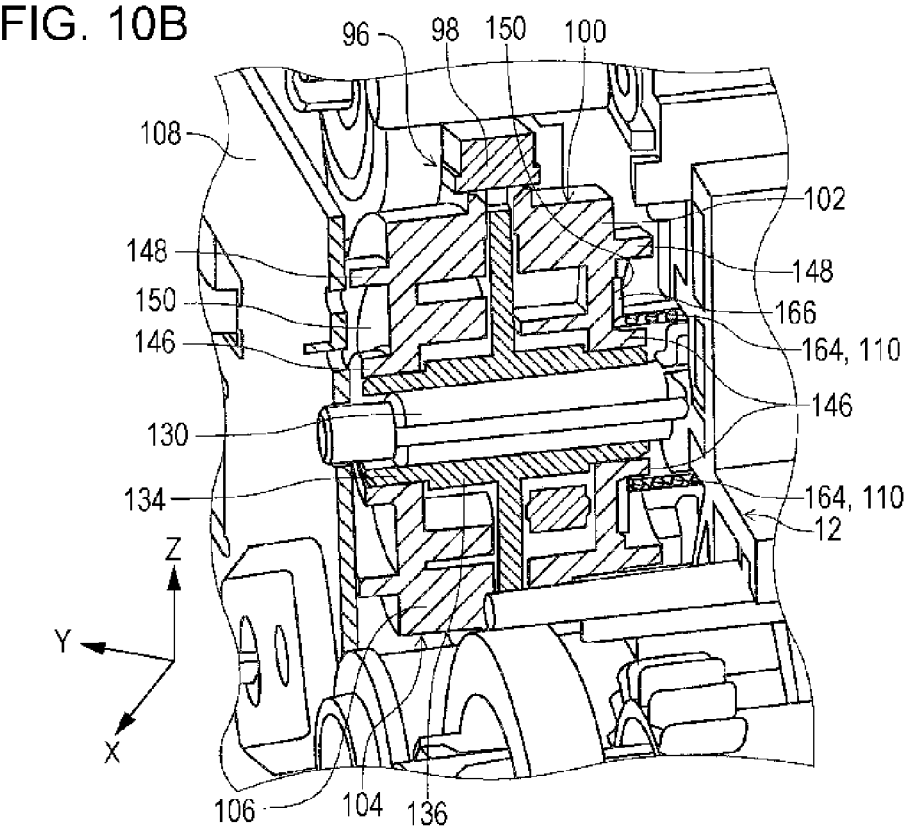
FIG. 10B is a cross-sectional perspective view of the one-way compound gear mechanism in a state of being pressed by the resistance applying unit.
Figure 11A:
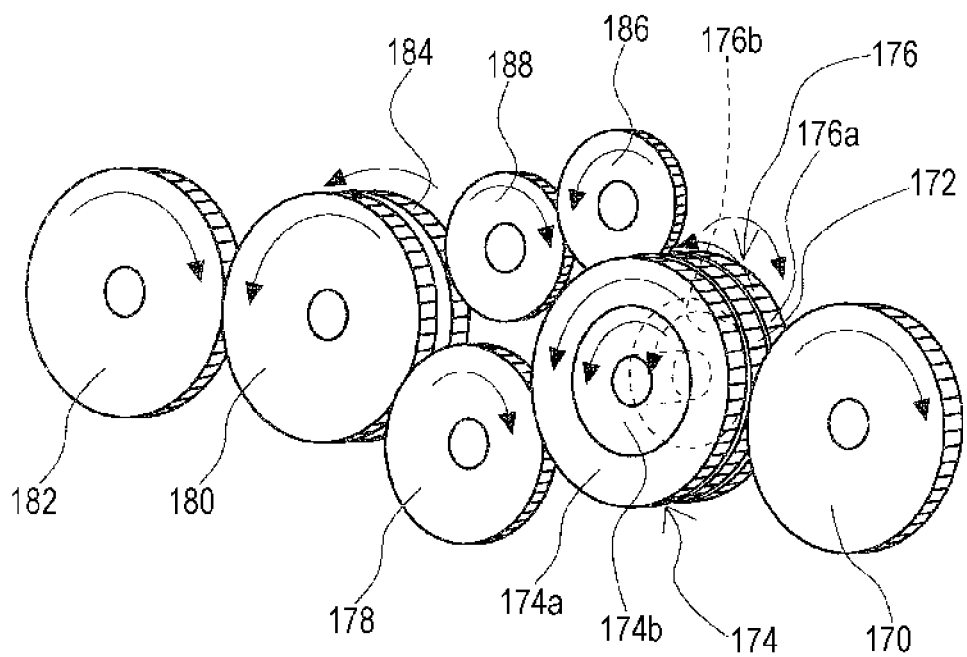
FIG. 11A is a perspective view for describing a driving state of a driving mechanism in the related art, which adopts a plurality of one-way clutches, when a center gear rotates forwardly.
Figure 11B:
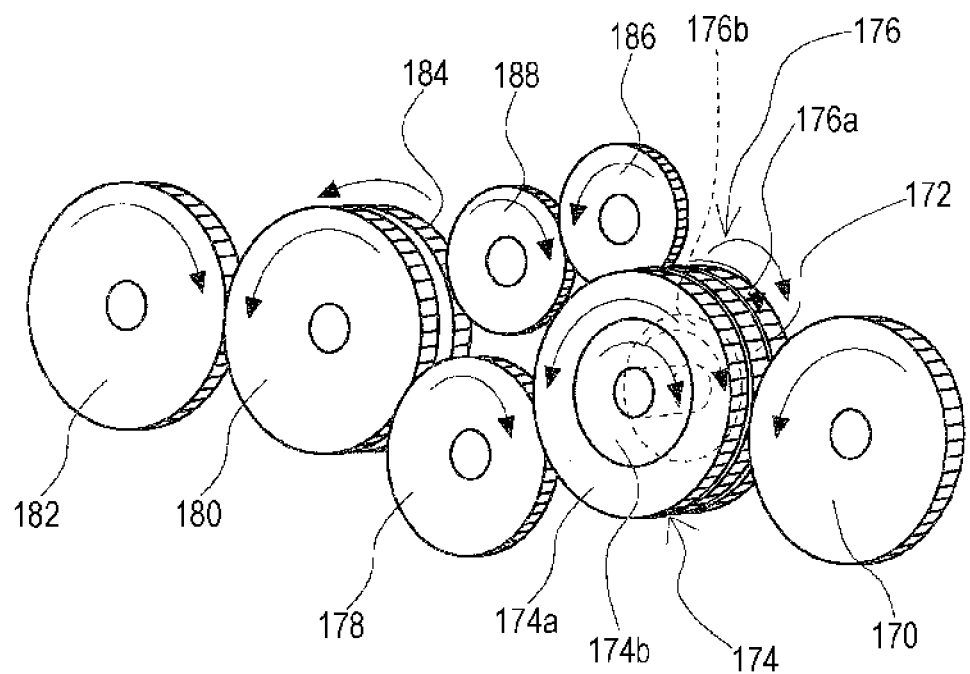
FIG. 11B is a perspective view for describing a driving state of the driving mechanism when the center gear rotates reversely.

FIG. 10A is an explanatory view of a resistance applying unit for pressing the one-way compound gear mechanism, and FIG. 10B is a cross-sectional perspective view of the one-way compound gear mechanism in a state of being pressed by the resistance applying unit. FIG. 11A is a perspective view for describing a driving state of a driving mechanism in the related art, which adopts a plurality of one-way clutches, when a center gear rotates forwardly, and FIG. 11B is a perspective view for describing a driving state of the driving mechanism when the center gear rotates reversely.

Further, to illustrate the rollers disposed on the paper transport passage of a printer 10, almost all of the rollers are disposed on the same surface in FIGS. 1 and 3. However, the positions of the rollers in a depth direction (a front-rear direction of a paper sheet in FIGS. 1 and 3) are not necessarily matched to the actual positions thereof (it matches in some cases). Furthermore, in an X-Y-Z coordinate system of the drawings, an x-direction is a scanning direction of a recording head, a y-direction is the depth direction of the recording apparatus, and a z-direction is a direction of changing a gap, namely a height direction of the apparatus. In addition, a −y direction indicates a front side of the apparatus, and a +y direction indicates a rear side of the apparatus in the drawings.

Hereinafter, details of configuration components disposed on a paper transport passage will be described with reference to FIG. 1. A apparatus main body 12 includes a feeding portion 18 constituted by a lower stage tray 14 which accommodates a paper sheet and an upper stage tray 16 which accommodates a paper sheet as a "recording medium" and is positioned on an upper side of the lower stage tray 14, feeding means 20, transporting means 22, recording means 24 and discharging means 26. The lower stage tray 14 and the upper stage tray 16 are mounted in the apparatus main body 12 so as to be respectively detachable from the front side of the apparatus. In addition, the feeding portion 18 further includes a pickup roller 28 and separating means 30.

Furthermore, the upper stage tray 16 is driven in the apparatus-depth direction (a y-axis direction in FIG. 1) by a motor (not shown). The upper stage tray 16 is movable between a butting position, namely a feedable position (see FIG. 1), and a retreating position (not shown) which is a position displaced from the butting position in the −y direction at a predetermined amount. Further, a reference symbol P1 is given to a paper sheet accommodated in the lower stage tray 14, and a reference symbol P2 is given to a paper sheet accommodated in the upper stage tray 16, in FIG. 1 (if there is no need to discriminate the paper sheet P1 from the paper sheet P2, the paper sheet is referred to as a "paper sheet P" hereinafter). In addition, the paper sheet P is an example of a medium to be transported.

The pickup roller 28 which is rotationally driven by a motor (not shown) is provided on an upper side of each tray. The pickup roller 28 is provided in an oscillation member 34 oscillating around an oscillation shaft 32. When the upper stage tray 16 is positioned at the feedable position, the pickup roller 28 is brought into contact with the uppermost one of the paper sheets P2 accommodated in the upper stage tray 16 and rotates. Thereby, the pickup roller 28 sends the uppermost paper sheet P2 from the upper stage tray 16 to a feeding passage.

When the upper stage tray 16 is positioned at the retreating position, the pickup roller 28 is brought into contact with the uppermost one of the paper sheets P1 accommodated in the lower stage tray 14 and rotates. Thereby, the pickup roller 28 sends the uppermost paper sheet P1 from the lower stage tray 14 to the feeding passage.

In addition, the separating means 30 is provided at a position opposite to a leading edge of the paper sheet P1 accommodated in the lower stage tray 14 and a leading edge of the paper sheet P2 accommodated in the upper stage tray 16. The separating means 30 is brought into contact with a leading edge of the paper sheet P which is sent out from the lower stage tray 14 or the upper stage tray 16 by the rotation of the pickup roller 28. The paper sheet P is transported to a downstream side of the feeding passage in a state of being in contact with the separating means 30. Thereby, the separating means 30 separates the uppermost paper sheet P from the next or subsequent paper sheets P. In this way, the feeding means 20 sends a sheet material (the paper sheet P), which is an example of a medium to be transported, to the downstream side of the feeding passage.

The feeding means 20 is provided on the downstream side of the feeding passage of the separating means 30. The feeding means 20 includes a feeding drive roller 40, which functions as a "feeding roller" and is driven by a driving motor 36 (see FIG. 2) and a power transmission mechanism 38 (see FIG. 2), a separating roller 42 and a feeding driven roller 44. The separating roller 42 is in contact with the feeding drive roller 40 and performs a separation of the paper sheet P again. Thereby, only the uppermost paper sheet P is securely sent to the downstream side of the feeding passage.

In addition, the feeding driven roller 44 which interposes the paper sheet P between the feeding driven roller 44 and the feeding drive roller 40 and is rotated by the feeding drive roller 40 is provided on the downstream side of the separating roller 42. Furthermore, the transporting means 22 including a transporting drive roller 46, which functions as a "transporting roller" and is driven by the driving motor 36 (see FIG. 2) and the power transmission mechanism 38 (see FIG. 2), and a transporting driven roller 48, which is rotated by the transporting drive roller 46 in a state of being in pressure contact with the transporting drive roller 46, is provided on the downstream side of the feeding passage of the feeding driven roller 44. The transporting means 22 causes the paper sheet P to be sent to the further downstream side.

The recording means 24 is provided on the downstream side of the transporting means 22. The recording means 24 includes a recording head 50 and a lower guiding member, namely a platen 52, which is opposite to the recording head 50 and functions as a supporting portion for supporting the paper sheet P. The recording head 50 is provided on a bottom portion of a carriage 54 and opposite to the paper sheet P. The carriage 54 is driven by a driving motor (not shown) so as to reciprocatively move in a main scanning direction (the front-rear direction of a paper sheet in FIG. 1, namely an x-axis direction).

The lower guiding member 52 supports the paper sheet P and regulates a gap PG which is a distance between the lower guiding member 52 and the recording head 50. In addition, the discharging means 26 which sends the recorded paper sheet P is provided on the downstream side of the lower guiding member 52. The discharging means 26 includes a discharging drive roller 56, which is driven by the driving motor 36 (see FIG. 2) and the power transmission mechanism 38 (see FIG. 2) and functions as a "discharge roller", and a discharge driven roller 58, which is rotated by the discharging drive roller 56 in a state of being in contact with the discharging drive roller 56.

The paper sheet P recorded by the recording means 24 is interposed between the discharging drive roller 56 and the discharge driven roller 58 and is discharged to a discharge stacker 60 provided on a front side (a right side in FIG. 1) of the apparatus main body 12. Furthermore, when an operation panel portion 62 provided on the front side of the apparatus main body 12 moves pivotally with respect to the apparatus main body 12, the discharge stacker 60 can be moved in directions in which the discharge stacker 60 is drawn out along the y-axis direction or is drawn in on an internal side of the apparatus main body 12. The drawn out direction along the y-axis direction is a direction where the discharge stacker 60 is displaced so as to protrude on an external side of the apparatus main body 12.

In addition, when the double-sided recording is performed on the paper sheet P by the printer 10, first, a first surface of the paper sheet P is recorded by the recording means 24. Then, a reverse feeding operation is performed by the transporting means 22 and the discharging means 26, and thereby the paper sheet P is returned to the upstream side of the transporting means 22 in a state in which the following edge side of the paper sheet P at the time of recording the first surface thereof becomes the leading edge side. Subsequently, the paper sheet P is sent to a reverse passage 64 by a returning operation of the transporting means 22. The paper sheet P sent to the reverse passage 64 is interposed between the feeding drive roller 40 and an inverting roller 66 and returned to the feeding passage again.

The paper sheet P returned to the feeding passage passes through the separating roller 42 and the feeding driven roller 44 and is resent to the transporting means 22 on the downstream side of the feeding passage by the feeding drive roller 40. At this time, the first surface and a second surface of the paper sheet P are bending-inverted, and therefore the second surface faces the recording head 50. The paper sheet P is sent to the recording means 24 by the transporting means 22. The paper sheet P of which the second surface is recorded by the recording means 24 is interposed between the components constituting the discharging means 26 and discharged to the discharge stacker 60 provided on the front side of the apparatus.

First Example

Further, details of the power transmission mechanism 38 of a first example according to the invention will be described with reference to FIGS. 2 and 3. The power transmission mechanism 38 is constituted by a plurality of gear wheel trains and disposed on the +x-axis direction side in the apparatus main body 12 of the recording apparatus 10. The power transmission mechanism 38 transmits a driving force of the driving motor 36, which is disposed on a lower side of the lower guiding member 52, to the feeding drive roller 40 of the feeding means 20, the transporting drive roller 46 of the transporting means 22 and the discharging drive roller 56 of the discharging means 26.

The power transmission mechanism 38 includes an oneway compound gear mechanism 96, which is constituted by a first gear 98, a first one-way gear mechanism 100 and a second one-way gear mechanism 104, a first power transmission passage 118, a second power transmission passage 122 and a resistance applying unit 110. Each component constituting the power transmission mechanism 38 will be described below.

As shown in FIG. 2, the feeding drive roller 40 includes a driving shaft 68 extending in the scanning direction, namely the x-axis direction. A gear for driving feeding drive roller 70 is provided on an end portion on the +x-axis direction side of the driving shaft 68. In addition, the transporting drive roller 46 includes a driving shaft 72 extending in the scanning direction, namely the x-axis direction. A gear for driving transporting drive roller 74 and a gear driven by transporting drive roller 76 are provided on an end portion on the +x-axis direction side of the driving shaft 72 of the transporting drive roller 46.

Furthermore, the discharging drive roller 56 includes a driving shaft 78 extending in the scanning direction, namely the x-axis direction. A gear for driving discharging drive roller 80 is provided on an end portion on the +x-axis direction side of the driving shaft 78 of the discharging drive roller 56.

A driving gear 82 is provided on a driving shaft of the driving motor 36. The driving gear 82 can rotate forwardly or reversely by the driving motor 36. Further, in the specification, the forward rotation of each gear or the driving motor 36 means that the rotation is carried out in a clockwise direction in FIG. 3, and the reverse rotation of each gear or the driving motor 36 means that the rotation is carried out in a counterclockwise direction in FIG. 3.

A compound gear 84 as a 'fifth transmission gear' is provided between the driving gear 82 and the gear for driving transporting drive roller 74. A large gear 86 and a small gear 88 are coaxially provided in the compound gear 84. The large gear 86 is engaged with the driving gear 82, and the small gear 88 is engaged with the gear for driving transporting drive roller 74. In addition, first to fourth transmission gears will be described below.

The compound gear 84 is formed by superimposing the large gear 86 and the small gear 88 on each other in the x-axis direction. Thus, in the compound gear 84, upon comparison with the case in which the fifth transmission gear is formed by a single spur gear, the thickness of the gear is increased in the axial direction of the gear. Therefore, it is possible to improve the rigidity of the fifth transmission gear. Thereby, vibration of the gear can be reduced. As a result, it is possible to reduce the noise due to the vibration of the gear.

Meanwhile, it is said that the number of teeth of a gear is one of the factors causing the vibration of the gear. If a gear has a large number of teeth, the amount of contact with the other gear in one rotation of the gear is increased as much as the number of teeth. Therefore, an amount of the contact between the gears is increased in a rotation, and the frequency (the vibration frequency) thereof is increased. Thus, if the frequency of the gear is increased, the frequency approaches the resonance frequency of the apparatus main body 12. As a result, there is a high possibility that the gear resonates with the apparatus main body 12. In other words, there is a possibility that the noise radiated from the apparatus main body 12 becomes louder by the resonance of the apparatus main body 12 due to the frequency of the gear.

The compound gear 84 is constituted by the large gear 86 and the small gear 88. Thus, upon comparison with the case in which the fifth transmission gear is formed by a single spur gear, the number of teeth of the large gear or the small gear can be reduced. Therefore, in one rotation of the compound gear 84, the amount of contact with the other gear is reduced in the large gear 86 and the small gear 88.

In other words, since it is possible to reduce the frequencies of the large gear 86 and the small gear 88 in one rotation of the compound gear 84, the frequencies of the large gear 86 and the small gear 88 are prevented from being overlapped with the resonance frequency of the apparatus main body 12. For this reason, the number of the teeth of the large gear 86 and the number of the teeth of the small gear 88 are set to have a frequency, namely the number of teeth, not to be overlapped with the resonance frequency of the apparatus main body 12. As a result, it is possible to reduce the noise which is caused by the power transmission mechanism 38 and radiated from the apparatus main body 12.

In addition, a ratio of the number of the teeth of the large gear 86 of the compound gear 84 and the number of the teeth of the small gear 88 is set to be a non-integer multiple. The reason why the ratio is set to be a non-integer multiple is as follows. If a ratio of the number of the teeth of the large gear 86 and the number of the teeth of the small gear 88 is set to be an integer multiple, the teeth of the large gear 86 may be always engaged with the same teeth of the driving gear 82 engaged therewith when the compound gear 84 rotates. Therefore, there is a possibility that partial wear could be caused.

As a result, vibration may be caused when the gear rotates. Thus, there is a possibility that the operation noise could be increased when the gear rotates. Also, there is a possibility that the similar phenomenon could occur in the small gear 88. For this reason, if the ratio of the number of the teeth of the large gear 86 and the number of the teeth of the small gear 88 is set to be a non-integer multiple, the teeth of the gear are prevented from being always engaged with the same teeth of a gear engaged therewith. Therefore, it is possible to suppress the possibility of partial wear of the gear. As a result, it is possible to suppress the noise caused by the vibration of the gear.

In addition, the reduction ratio of the large gear 86 of the compound gear 84 and the driving gear 82 engaged with the large gear 86 is set to be a non-integer multiple of the reduction ratio of the small gear 88 and the gear for driving transporting drive roller 74 engaged with the small gear 88.

In other words, when the number of the teeth of the large gear 86 is designated by $\alpha 1$ and the number of the teeth of the driving gear 82 is designated by $\alpha 2$, a reduction ratio of the large gear 86 and the driving gear 82 is expressed as $\alpha 1/\alpha 2 = \beta 1$. Furthermore, when the number of the teeth of the small gear 88 is designated by $\alpha 3$ and the number of the teeth of the gear for driving transporting drive roller 74 is designated by $\alpha 4$, a reduction ratio of the small gear 88 and the gear for driving transporting drive roller 74 is expressed as $\alpha 4/\alpha 3 = \beta 2$. In addition, the reduction ratio $\beta 1$ of the large gear 86 and the driving gear 82 is set to be a non-integer multiple of the reduction ratio $\beta 2$ of the gear for driving transporting drive roller 74 and the small gear 88.

In the case described above, the power transmission is performed in a direction from the driving gear 82 to the gear for driving transporting drive roller 74. On the contrary, when the power transmission is performed in a direction from the gear for driving transporting drive roller 74 to the driving gear 82, the aspect is as follows. When the reduction ratio of the driving gear 82 and the large gear 86 is designated by $\alpha 2/\alpha 1 = \beta 3$ and the reduction ratio of the small gear 88 and the gear for driving transporting drive roller 74 is designated by $\alpha 3/\alpha 4 = \beta 4$, the reduction ratio $\beta 3$ of the driving gear 82 and the large gear 86 is set to be a non-integer multiple of the reduction ratio $\beta 4$ of the small gear 88 and the gear for driving transporting drive roller 74.

Meanwhile, when the transporting drive roller 46 is driven by the driving motor 36, vibration is generated between the large gear 86 and the driving gear 82 by the engagement of gears. In this case, the vibration generated between the large gear 86 and the driving gear 82 has a frequency, namely a meshing frequency, corresponding to the reduction ratio of the large gear 86 and the driving gear 82. Similarly, vibration having a frequency, namely a meshing frequency, corresponding to the reduction ratio of the small gear 88 and the gear for driving transporting drive roller 74 is generated between the small gear 88 and the gear for driving transporting drive roller 74, as well.

If the frequency (the meshing frequency) of the vibration generated between the large gear 86 and the driving gear 82 is an integer multiple of the frequency (the meshing frequency) of the vibration generated between the small gear 88 and the gear for driving transporting drive roller 74, resonance phenomena occur. Therefore, the vibration caused by the resonance phenomena is transmitted to the apparatus main body 12 or the transporting drive roller 46, and thereby noise is generated in the apparatus main body 12 or the transporting drive roller 46.

For this reason, the frequency (the meshing frequency) of the vibration generated between the large gear 86 and the driving gear 82 is set to be a non-integer multiple of the frequency (the meshing frequency) of the vibration generated between the small gear 88 and the gear for driving transporting drive roller 74. Thereby, it is possible to prevent the resonance phenomena. Thus, it is possible to suppress the noise caused by the vibration of the gear.

In addition, the gear for driving transporting drive roller 74 is engaged with an intermediate gear 90, and the intermediate gear 90 is engaged with the gear for driving discharging drive roller 80. Therefore, the discharging drive roller 56 can interconnectedly rotate in the same direction as that of the transporting drive roller 46.

Furthermore, the gear driven by transporting drive roller 76 provided in the driving shaft 72 of the transporting drive roller 46 is engaged with an intermediate gear 92, and the intermediate gear 92 is engaged with an intermediate gear 94. The intermediate gear 94 is engaged with the first gear 98 of the one-way compound gear mechanism 96.

In the one-way compound gear mechanism 96, the first gear 98 is disposed at an axial (the x-axis direction in FIG. 2) center position of the gear. Further, a second gear 102 constituting the first one-way gear mechanism 100 is disposed on the −x-axis side, coaxially with the first gear 98. In addition, a third gear 106 constituting the second one-way gear mechanism 104 is disposed on the +x-axis side, coaxially with the first gear 98 and the second gear 102.

Furthermore, the one-way compound gear mechanism 96 is rotatably installed in a frame 108 (see FIG. 4) of the apparatus main body 12. In addition, the one-way compound gear mechanism 96 includes the resistance applying unit 110 which presses the one-way compound gear mechanism 96 in the x-axis direction such that the one-way compound gear mechanism 96 is pressed against the frame 108. Further, the configurations of the one-way compound gear mechanism 96, the first one-way gear mechanism 100, the second one-way gear mechanism 104 and the resistance applying unit 110 will be described below.

The second gear 102 is engaged with a first transmission gear 112, and the first transmission gear 112 is engaged with a second transmission gear 114. The second transmission gear 114 is engaged with a fourth transmission gear 116. The first transmission gear 112 and the second transmission gear 114 constitute the first power transmission passage 118 which transmits a driving force from the second gear 102 to the fourth transmission gear 116.

In addition, the third gear 106 is engaged with a third transmission gear 120. The third transmission gear 120 is engaged with the fourth transmission gear 116. The third transmission gear 120 constitutes the second power transmission passage 122 which transmits a driving force from the third gear 106 to the fourth transmission gear 116.

The fourth transmission gear 116 which receives a driving force from the first power transmission passage 118 or the second power transmission passage 122 is engaged with an intermediate gear 124. The intermediate gear 124 is engaged with an intermediate gear 126. The intermediate gear 126 is engaged with the gear for driving feeding drive roller 70.

Hereinafter, the transmission of a driving force from the one-way compound gear mechanism 96 to the gear for driving feeding drive roller 70 will be described with reference to FIGS. 5A and 5B. Furthermore, an arrow of the two-dot chain line in FIGS. 5A and 5B shows a transmission direction of a driving force. As shown in FIG. 5A, when the first gear 98 of the one-way compound gear mechanism 96 rotates forwardly, the second gear 102 of the first one-way gear mechanism 100 rotates forwardly in conjunction with the first gear 98. Therefore, the driving force is transmitted.

The first one-way gear mechanism 100 causes the first transmission gear 112 and the second transmission gear 114 which constitute the first power transmission passage 118 to rotate in a direction of the arrow shown in the drawing. The fourth transmission gear 116 rotates reversely by receiving the driving force from the first power transmission passage 118. The fourth transmission gear 116 causes the gear for driving feeding drive roller 70 to rotate forwardly via the intermediate gear 124 and the intermediate gear 126.

In addition, the fourth transmission gear 116 transmits the driving force from the first power transmission passage 118 to the second power transmission passage 122, namely the third transmission gear 120. Then, the third transmission gear 120 causes the third gear 106 of the second one-way gear mechanism 104 to rotate reversely. Therefore, the third gear 106 rotates idly with respect to the first gear 98.

As shown in FIG. 5B, when the first gear 98 of the one-way compound gear mechanism 96 rotates reversely, the third gear 106 of the second one-way gear mechanism 104 rotates reversely in conjunction with the first gear 98. Therefore, the driving force is transmitted.

The second one-way gear mechanism 104 causes the third transmission gear 120 constituting the second power transmission passage 122 to rotate forwardly. The fourth transmission gear 116 rotates reversely by receiving the driving force from the second power transmission passage 122. The fourth transmission gear 116 causes the gear for driving feeding drive roller 70 to rotate forwardly via the intermediate gear 124 and the intermediate gear 126.

In addition, the fourth transmission gear 116 transmits the driving force from the second power transmission passage 122 to the first power transmission passage 118, namely the first transmission gear 112 and the second transmission gear 114. Then, the first transmission gear 112 causes the second gear 102 of the first one-way gear mechanism 100 to rotate forwardly. Therefore, the second gear 102 rotates idly with respect to the first gear 98.

Therefore, the gear for driving feeding drive roller 70 is rotated in a predetermined direction (a forward-rotation direction in the example) by the power transmission mechanism 38, regardless of the rotation direction of the first gear 98, namely the rotation direction of the driving motor 36. As a result, the feeding drive roller 40 in the example can rotate in the predetermined direction, regardless of the rotation direction of the driving motor 36.

According to the description described above, the power transmission mechanism 38 having a single driving motor 36 can drive the feeding drive roller 40, the transporting drive roller 46, and the discharging drive roller 56. In other words, it is possible for the power transmission mechanism 38 to have only one driving source, and therefore it is unnecessary to prepare a space for a plurality of driving sources in the apparatus main body 12. Thus, it is possible for the printer 10 to be reduced in size. Further, it is possible to simplify the configuration of the power transmission mechanism 38.

Next, the details of the configurations of the one-way compound gear mechanism 96, the first one-way gear mechanism 100 and the second one-way gear mechanism 104 will be described with reference to FIGS. 4, 6A, 6B, 7A, 7B, 8A, 8B, 9A, 9B, 10A and 10B.

The one-way compound gear mechanism 96 includes the first gear 98, the first one-way gear mechanism 100 and the second one-way gear mechanism 104 (see FIGS. 4 and 6A). In the first gear 98, a gear 128 constituting the first gear 98 is formed on an outer periphery thereof, as shown in FIG. 6B. Further, a through hole 132 in which a shaft 130 (see FIG. 4) is inserted is provided in a center portion through which an axis line passes. The shaft 130 is used to mount the one-way compound gear mechanism 96 on the apparatus main body 12. In addition, boss portions 134 having a cylindrical shape are formed on both surfaces of the first gear 98. The boss portion 134 is provided on a periphery of the through hole 132. Further, a sun gear 136 is formed on an outer circumference surface of the boss portion 134.

Subsequently, the configuration of the first one-way gear mechanism 100 will be described with reference to FIGS. 7A and 7b. The first one-way gear mechanism 100 includes the second gear 102 and a plurality of planetary gears 138 disposed in the second gear 102.

In the second gear 102, a gear 140 constituting the second gear 102 is formed on an outer periphery thereof. Further, on one side 142 (see FIG. 7A) of the second gear, a through hole 144 is formed in a center portion through which an axis line passes. The boss portion 134 of the first gear 98 is inserted in the through hole 144 so as to enable the second gear 102 to rotate with respect to the first gear 98. In addition, a boss portion 146 having a cylindrical shape is provided in a periphery of the through hole 144 of the second gear 102. Further, a protrusion portion 148 having a cylindrical shape is provided in the periphery of the through hole 144 so as to be spaced apart from an outer periphery of the boss portion 146. In addition, a recessed portion 150 having a ring shape is formed between the boss portion 146 and the protrusion portion 148.

Furthermore, a recessed portion 152 is formed on the other side 151 of the second gear 102, as shown in FIG. 7B. The recessed portion 152 is opened to the other side 151 and communicated with the through hole 144. In addition, recess sections 154*a*, 154*b* and 154*c* are provided in a circumferential direction of the recessed portion 152 so as to be spaced apart from the axis line of the second gear 102. A plurality of planetary gears 138*a*, 138*b* and 138*c* are respectively rotatably disposed in the recess sections 154*a*, 154*b* and 154*c*. Further, the planetary gears 138*a*, 138*b* and 138*c* are engaged with the sun gear 136.

In addition, engaging portion 156*a*, 156*b* and 156*c* are respectively provided in the recess sections 154*a*, 154*b* and 154*c* (see FIG. 8B). When the planetary gears 138*a*, 138*b* and 138*c* disposed in the recess sections 154*a*, 154*b* and 154*c* rotate in the predetermined direction, the engaging portion 156*a*, 156*b* and 156*c* are respectively engaged with the planetary gears 138*a*, 138*b* and 138*c*. Thereby, the rotation of the planetary gears 138*a*, 138*b* and 138*c* is restricted. The restriction direction of the second gear 102 is the reverse-rotation direction of the planetary gears 138*a*, 138*b* and 138*c*. The restriction direction of the third gear 106 is the forward-rotation direction of planetary gears 160*a*, 160*b* and 160*c*.

Further, upon comparison with the configuration of the first one-way gear mechanism 100, the configuration of the second one-way gear mechanism 104 only has a difference in that the rotation direction of allowing the torque-transmission is opposite to that in the first one-way gear mechanism 100.

Therefore, the description of the configuration of the second one-way gear mechanism 104 is omitted.

Next, motions of the first one-way gear mechanism 100 and the second one-way gear mechanism 104 will be described with reference to FIGS. 8A, 8B, 9A and 9B. FIG. 8A is a cross-sectional view taken along line VIIIA-VIIIA in FIG. 6A and shows the motion of the second one-way gear mechanism 104 when the first gear 98 rotates forwardly. FIG. 8B is a cross-sectional view taken along line VIIIB-VIIIB in FIG. 6A and shows the motion of the first one-way gear mechanism 100 when the first gear 98 rotates forwardly.

Furthermore, FIG. 9A is the cross-sectional view taken along line VIIIA-VIIIA in FIG. 6A and shows the motion of the second one-way gear mechanism 104 when the first gear 98 rotates reversely. FIG. 9B is the cross-sectional view taken along line VIIIB-VIIIB in FIG. 6A and shows the motion of the first one-way gear mechanism 100 when the first gear 98 rotates reversely.

Motions of First One-Way Gear Mechanism 100 and Second One-Way Gear Mechanism 104 when First Gear 98 Rotates Forwardly When the first gear 98 rotates forwardly, the sun gear 136 provided in the first gear 98 also rotates forwardly. Therefore, when the sun gear 136 rotates forwardly, the planetary gears 138a, 138b and 138c in the first one-way gear mechanism 100 may rotate reversely in the recess sections 154a, 154b and 154c (see FIG. 8). However, when the planetary gears 138a, 138b and 138c may rotate reversely, the teeth of the planetary gears 138a, 138b and 138c are respectively engaged with the engaging portion 156a, 156b and 156c.

Therefore, the reverse rotation of the planetary gears 138a, 138b and 138c is regulated. The planetary gears 138a, 138b and 138c are integrated with the sun gear 136 and start the idle-rotation around the sun gear 136 in the forward direction. Thereby, the second gear 102 is rotated forwardly by the planetary gears 138a, 138b and 138c which idly rotate around the sun gear 136 in the forward direction.

Meanwhile, when the sun gear 136 rotates forwardly, the planetary gears 160a, 160b and 160c disposed in the recess sections 158a, 158b and 158c of the third gear 106 rotate reversely in the second one-way gear mechanism 104 (see FIG. 8A). At this time, engaging portions 162a, 162b and 162c provided in the recess sections 158a, 158b and 158c are not respectively engaged with the teeth of the planetary gears 160a, 160b and 160c. Thereby, the reverse rotation of the planetary gears 160a, 160b and 160c is not regulated.

Furthermore, the driving force from the first one-way gear mechanism 100 passes through the first power transmission passage and acts on the second power transmission passage. Then, the driving force causes the third gear 106 to rotate reversely. At this time, the planetary gears 160a, 160b and 160c idly rotate around the sun gear 136 in the reverse direction. Thus, the planetary gears 160a, 160b and 160c do not hinder the reverse rotation of the third gear 106. As a result, the third gear 106 rotates idly with respect to the first gear 98.

Motions of First One-Way Gear Mechanism 100 and Second One-Way Gear Mechanism 104 when First Gear 98 Rotates Reversely When the first gear 98 rotates reversely, the sun gear 136 provided in the first gear 98 also rotates reversely. Therefore, when the sun gear 136 rotates reversely, the planetary gears 160a, 160b and 160c in the second one-way gear mechanism 104 may rotate forwardly in the recess sections 158a, 158b and 158c (see FIG. 9A). However, when the planetary gears 160a, 160b and 160c may rotate forwardly, the teeth of the planetary gears 160a, 160b and 160c are respectively engaged with the engaging portion 162a, 162b and 162c.

Therefore, the forward rotation of the planetary gears 160a, 160b and 160c is regulated. The planetary gears 160a, 160b and 160c are integrated with the sun gear 136 and start idle-rotation around the sun gear 136 in the reverse direction. Thereby, the second gear 102 is rotated reversely by the planetary gears 138a, 138b and 138c which idly rotate around the sun gear 136 in the reverse direction.

Meanwhile, when the sun gear 136 rotates forwardly, the planetary gears 138a, 138b and 138c disposed in the recess sections 154a, 154b and 154c of the second gear 102 rotate forwardly in the first one-way gear mechanism 100 (see FIG. 9B). At this time, engaging portions 156a, 156b and 156c provided in the recess sections 154a, 154b and 154c are respectively engaged with the teeth of the planetary gears 138a, 138b and 138c. Thereby, the forward rotation of the planetary gears 138a, 138b and 138c is not regulated.

Furthermore, the driving force from the second one-way gear mechanism 104 passes through the second power transmission passage and acts on the first power transmission passage. Then, the driving force causes the second gear 102 to rotate forwardly. At this time, the planetary gears 138a, 138b and 138c idly rotate around the sun gear 136 in the forward direction. Thus, the planetary gears 138a, 138b and 138c do not hinder the forward rotation of the second gear 102. As a result, the second gear 102 rotates idly with respect to the first gear 98.

The resistance applying unit 110 will be described with reference to FIGS. 10A and 10B. As shown in FIG. 10A, the shaft 130 to be inserted in the one-way compound gear mechanism 96 is provided on a apparatus main body 12 side. The shaft 130 passes through a spring member 164 constituting the resistance applying unit 110. The spring member 164 is installed on the apparatus main body 12 side so as not to be rotatable with respect to the apparatus main body 12.

In addition, a sliding member 166 is disposed in the recessed portion 150 in the second gear 102 of the first one-way gear mechanism 100 facing the spring member 164. Specifically, the recessed portion 150 having a ring shape is formed between the boss portion 146 and the protrusion portion 148 of the second gear 102. Further, the shaft 130 is inserted in the one-way compound gear mechanism 96. When the one-way compound gear mechanism 96 rotates forwardly or reversely, an end portion of the spring member 164 which is opposite to the other end portion installed in the apparatus main body 12 slides on the sliding member 166.

As shown in FIG. 10B, the shaft 130 is inserted in the one-way compound gear mechanism 96, and the protrusion portion 148 of the third gear 106 of the second one-way gear mechanism 104 is pressed against the frame 108 by a biasing force of the spring member 164. In other words, the one-way compound gear mechanism 96 is pressed in the axial direction of the one-way compound gear mechanism 96 by the spring member 164.

Thereby, the second gear 102 of the first one-way gear mechanism 100 is pressed, via the sliding member 166, against the first gear 98 by the biasing force of the spring member 164. Thus, a friction force between the first gear 98 and the second gear 102 is increased. As a result, it is possible to apply the rotational resistance to the second gear 102 in an idle rotation state when the first gear 98 rotates reversely.

Therefore, it is possible to reduce the displacement momentum of the tooth in the idle-rotation direction when the second gear 102 rotates idly. Thus, a tooth of the second gear 102, which is adjacent to the tooth displaced in the idle-rotation direction and subsequently engaged with the first transmission gear 112, is prevented from colliding with the tooth of the first transmission gear 112, which causes the tooth of the second gear 102 to be displaced. As a result, the engagement between the second gear 102 and the first transmission gear 112 can be performed smoothly by the biasing force of the spring member 164. Thus, it is possible to reduce the operation noise.

Furthermore, the protrusion portion 148 of the third gear 106 of the second one-way gear mechanism 104 is pressed against to the frame 108 by the biasing force of the spring member 164. Thus, a friction force between the first gear 98 and the third gear 106 is increased. As a result, it is possible to apply the rotational resistance to the third gear 106 in an idle rotation state when the first gear 98 rotates forwardly. Therefore, similarly to the case of the second gear 102, it is possible to reduce the displacement momentum of the tooth in the idle-rotation direction when the third gear 106 rotates idly. As a result, the engagement between the third gear 106 and the third transmission gear 120 can be performed smoothly, and therefore it is possible to reduce the operation noise.

Furthermore, the wheel trains of the power transmission mechanism 38 in the example are constituted by the plurality of gears engaged with each other, as described above. Under the consideration of an error of a component or an error of installation, a center distance between the engaged gears in the power transmission mechanism 38 is set to the value in which a tooth contact ratio is equal to or more than 1. As a result, the gears may rotate smoothly in an engaged state.

The summary of the description will follow. The recording apparatus 10 of the example includes the feeding drive roller 40 which feeds the paper sheet P in a downstream direction of the feeding passage by rotating forwardly and the power transmission mechanism 38 for transmitting the driving force from the driving motor 36 to the feeding drive roller 40. Further, the power transmission mechanism 38 includes the one-way compound gear mechanism 96 that integrally includes the first one-way gear mechanism 100 which is engaged with the first gear 98 rotating forwardly or reversely by receiving the driving force form the driving motor 36, rotates together with the first gear 98 in the forward direction by receiving the driving force from the first gear 98 at the time of the forward rotation and rotates idly with respect to the first gear 98 at the time of the reverse rotation, and the second one-way gear mechanism 104 which is engaged with the first gear 98, rotates idly with respect to the first gear 98 at the time of the forward rotation and rotates together with the first gear 98 in a reverse direction by receiving the driving force from the first gear 98 at the time of the reverse rotation; the first power transmission passage 118 which is a power transmission passage between the first one-way gear mechanism 100 and the feeding drive roller 40, causes the feeding drive roller 40 to rotate forwardly by receiving the driving force from the first one-way gear mechanism 100 at the time of the forward rotation of the first gear 98 and causes the first one-way gear mechanism 100 to idly rotate by receiving the driving force from the feeding drive roller 40 at the time of the reverse rotation of the first gear 98; and the second power transmission passage 122 which is a power transmission passage between the second one-way gear mechanism 104 and the feeding drive roller 40, causes the feeding drive roller 40 to rotate forwardly by receiving the driving force from the second one-way gear mechanism 104 at the time of the reverse rotation of the first gear 98 and causes the second one-way gear mechanism 104 to idly rotate by receiving the driving force from the feeding drive roller 40 at the time the forward rotation of the first gear 98, and the one-way compound gear mechanism 96 includes the resistance applying unit 110 for applying the rotational resistance to both gears of which one is the second gear 102 that is disposed coaxially with the first gear 98, transmits the driving force to the first power transmission passage 118 and constitutes the first one-way gear mechanism 100, and the other one is the third gear 106 that is disposed coaxially with the first gear 98, transmits the driving force to the second power transmission passage 122 and constitutes the second one-way gear mechanism 104.

The resistance applying unit 110 includes the spring member 164 which is constituted by a single member and presses the one-way compound gear mechanism 96 in the axial direction of the one-way compound gear mechanism 96. The first power transmission passage 118 includes the first transmission gear 112 engaged with the second gear 102 and the second transmission gear 114 engaged with the first transmission gear 112. The second power transmission passage 122 includes the third transmission gear 120 engaged with the third gear 106. The power transmission mechanism 38 includes the fourth transmission gear 116 which is engaged with the second transmission gear 114 and the third transmission gear 120. The fourth transmission gear 116 transmits the driving force from the first power transmission passage 118 or the second power transmission passage 122 to the feeding drive roller 40, and transmits the driving force from the first power transmission passage 118 to the second power transmission passage 122. Further, the fourth transmission gear 116 transmits the driving force from the second power transmission passage 122 to the first power transmission passage 118.

The recording apparatus 10 includes the transporting drive roller 46 which transports the paper sheet P. The transporting drive roller 46 is rotatable forwardly or reversely corresponding to the rotation direction of the driving motor 36. The power transmission mechanism 38 includes the compound gear 84 which transmits the driving force from the driving motor 36 to the transporting drive roller 46. The compound gear 84 is coaxially provided with the large gear 86 and the small gear 88. The number of the teeth of the large gear 86 and the number of the teeth of the small gear 88 are set to the value in which the frequency thereof is not overlapped with the resonance frequency of the apparatus main body 12 provided with the power transmission mechanism 38.

In addition, the ratio of the number of the teeth of the large gear 86 of the compound gear 84 and the number of the teeth of the small gear 88 is set to be a non-integer multiple. Further, the reduction ratio of the large gear 86 of the compound gear 84 and the driving gear 82 engaged with the large gear 86 is set to be a non-integer multiple of the reduction ratio of the small gear 88 and the gear for driving transporting drive roller 74 engaged with the small gear 88.

The power transmission mechanism 38 includes a plurality of gears. Further, the center distance between the gears is set to the value in which a tooth contact ratio is equal to or more than 1. In addition, the recording apparatus 10 includes the discharging drive roller 56 which discharges the paper sheet P outside the apparatus main body 12, along the feeding passage. The power transmission mechanism 38 transmits the driving force from the driving motor 36 to the discharging drive roller 56.

Modification Example of First Example (1) In the first example, the resistance applying unit 110 has a configuration in which the second gear 102 and the third gear 106 are pressed in the axial direction. However, without being limited thereto, the resistance applying unit 110 may have a configuration in which the idle rotation of the second gear 102 or the third gear 106 is mechanically braked in the idle-rotation direction.

(2) In the first example, the feeding drive roller 40, the transporting drive roller 46 and the discharging drive roller 56 are driven by a single driving motor 36. However, without being limited thereto, each of the feeding drive roller 40, the transporting drive roller 46 and the discharging drive roller 56 may have a driving source and be driven individually.

Further, in the embodiment, the power transmission mechanism 38 according to the invention is applied to an ink jet printer as an example of the recording apparatus. However, without being limited thereto, the power transmission mechanism 38 may be applied to other types of general liquid ejecting apparatuses.

In this case, the liquid ejecting apparatus includes a recording apparatus, such as a printer, a copying machine or a facsimile, which is provided with an ink-jet type recording head and performs recording on a recording medium by causing the recording head to eject ink. Further, the liquid ejecting apparatus includes an apparatus which causes liquid substituting ink to land on an ejection-object medium corresponding to a recording medium by causing a liquid ejecting head substituting the ink-jet type recording head to eject the liquid on the ejection-object medium.

The liquid ejecting head not only includes the recording head described above but also includes a coloring material ejecting head used to manufacture a color filter for a liquid crystal display or the like, an electrode material (conductive pastes) ejecting head used to form an electrode for an organic EL display, a field emission display (FED) or the like, a bio-organic material ejecting head used to manufacture a biochip, a sample ejecting head as a precision pipette, or the like.

Further, the invention is not limited to the examples described above. The invention can be modified variously as long as it does not depart from the scope of the invention. Needless to say, the scope of the invention does not include the various modifications.

The entire disclosure of Japanese Patent Application No. 2012-176360, filed Aug. 8, 2012 is expressly incorporated by reference herein.

What is claimed is:

1. A recording apparatus comprising:
   a feeding roller which feeds a recording medium in a downstream direction of a feeding passage by rotating forwardly; and
   a power transmission mechanism for transmitting a driving force from a driving source to the feeding roller,
   wherein the power transmission mechanism includes
      a one-way compound gear mechanism that integrally includes a first one-way gear mechanism which is engaged with a first gear rotating forwardly or reversely by receiving the driving force from the driving source, rotates together with the first gear in a forward direction by receiving the driving force from the first gear at the time of the forward rotation and rotates idly with respect to the first gear at the time of the reverse rotation, and a second one-way gear mechanism which is engaged with the first gear, rotates idly with respect to the first gear at the time of the forward rotation and rotates together with the first gear in a reverse direction by receiving the driving force from the first gear at the time of the reverse rotation;
      a first power transmission passage which is a power transmission passage between the first one-way gear mechanism and the feeding roller, causes the feeding roller to rotate forwardly by receiving the driving force from the first one-way gear mechanism at the time of the forward rotation of the first gear and causes the first one-way gear mechanism to idly rotate by receiving the driving force from the feeding roller at the time of the reverse rotation of the first gear; and
      a second power transmission passage which is a power transmission passage between the second one-way gear mechanism and the feeding roller, causes the feeding roller to rotate forwardly by receiving the driving force from the second one-way gear mechanism at the time of the reverse rotation of the first gear and causes the second one-way gear mechanism to idly rotate by receiving the driving force from the feeding roller at the time the forward rotation of the first gear, and
   wherein the one-way compound gear mechanism includes a second gear that is disposed coaxially with the first gear, transmits the driving force to the first power transmission passage and constitutes the first one-way gear mechanism, a third gear that is disposed coaxially with the first gear, transmits the driving force to the second power transmission passage and constitutes the second one-way gear mechanism, and a resistance applying unit which applies a rotational resistance to both the gears.

2. The recording apparatus according to claim 1,
   wherein the resistance applying unit is a single biasing member to press the one-way compound gear mechanism in an axial direction of the one-way compound gear mechanism.

3. The recording apparatus according to claim 2,
   wherein the first power transmission passage includes a first transmission gear engaged with the second gear and a second transmission gear engaged with the first transmission gear,
   wherein the second power transmission passage includes a third transmission gear engaged with the third gear, and
   wherein the power transmission mechanism includes a fourth transmission gear which is engaged with the second transmission gear and the third transmission gear so as to cause the driving force from the first power transmission passage or the second power transmission passage to be transmitted to the feeding roller, and to cause the driving force from the first power transmission passage to be transmitted to the second power transmission passage or to cause the driving force from the second power transmission passage to be transmitted to the first power transmission passage.

4. The recording apparatus according to claim 3, further comprising:
   a transporting roller which transports the recording medium and rotates forwardly or reversely corresponding to a rotation direction of the driving source,
   wherein the power transmission mechanism includes a fifth transmission gear to transmit the driving force from the driving source to the transporting roller, and
   wherein the fifth transmission gear is a compound gear coaxially provided with a large gear and a small gear.

5. The recording apparatus according to claim 4,
   wherein the number of teeth of the large gear and the number of teeth of the small gear are set to the value in which the frequency thereof is not overlapped with a resonance frequency of an apparatus main body provided with the power transmission mechanism.

6. The recording apparatus according to claim 4,
   wherein a ratio of the number of the teeth of the large gear of the fifth transmission gear and the number of the teeth of the small gear is set to be a non-integer multiple.

7. The recording apparatus according to claim 4,
wherein a reduction ratio of the large gear of the fifth transmission gear and a gear engaged with the large gear is set to be a non-integer multiple of a reduction ratio of the small gear and a gear engaged with the small gear.

8. The recording apparatus according to claim 3,
wherein the power transmission mechanism includes a plurality of gears, and
wherein a center distance between the gears is set to the value in which a tooth contact engagement ratio is equal to or more than 1.

9. The recording apparatus according to claim 3, further comprising:
a discharge roller which discharges a recording medium outside the apparatus main body, along a feeding passage,
wherein the power transmission mechanism transmits the driving force from the driving source to the discharge roller.

10. A one-way compound gear mechanism comprising:
a first gear which rotates forwardly or reversely by receiving a driving force from a driving source;
a second gear which is engaged with the first gear, rotates together with the first gear in a forward direction by receiving the driving force from the first gear at the time of the forward rotation of the driving source, and rotates idly with respect to the first gear at the time of the reverse rotation of the driving source;
a third gear which is engaged with the first gear, rotates idly with respect to the first gear at the time of the forward rotation of the driving source, and rotates together with the first gear in a reverse direction by receiving the driving force from the first gear at the time of the reverse rotation of the driving source, and
a resistance applying unit which is disposed coaxially with the first gear and applies a rotational resistance to the second gear and the third gear.

11. The one-way compound gear mechanism according to claim 10,
wherein the resistance applying unit is a single biasing member to press the one-way compound gear mechanism in an axial direction of the one-way compound gear mechanism.

* * * * *